(12) United States Patent
Lee et al.

(10) Patent No.: US 10,681,591 B2
(45) Date of Patent: Jun. 9, 2020

(54) METHOD AND APPARATUS FOR CONTROLLING ELECTRONIC DEVICE IN WIRELESS COMMUNICATION SYSTEM SUPPORTING BLUETOOTH COMMUNICATION

(71) Applicant: LG ELECTRONICS INC., Seoul (KR)

(72) Inventors: Jaeho Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 260 days.

(21) Appl. No.: 15/500,322

(22) PCT Filed: May 8, 2015

(86) PCT No.: PCT/KR2015/004605
§ 371 (c)(1),
(2) Date: Jan. 30, 2017

(87) PCT Pub. No.: WO2016/017908
PCT Pub. Date: Feb. 4, 2016

(65) Prior Publication Data
US 2017/0223579 A1 Aug. 3, 2017

Related U.S. Application Data

(60) Provisional application No. 62/031,167, filed on Jul. 31, 2014, provisional application No. 62/067,406, (Continued)

(51) Int. Cl.
*H04W 36/00* (2009.01)
*H04W 76/10* (2018.01)
(Continued)

(52) U.S. Cl.
CPC ......... *H04W 36/0022* (2013.01); *H04W 4/80* (2018.02); *H04W 8/005* (2013.01);
(Continued)

(58) Field of Classification Search
CPC . H04W 36/0022; H04W 76/18; H04W 76/14; H04W 4/80; H04W 76/10;
(Continued)

(56) References Cited

U.S. PATENT DOCUMENTS

2011/0028085 A1* 2/2011 Waung ................. H04W 88/04
455/7
2011/0149806 A1 6/2011 Verma et al.
(Continued)

FOREIGN PATENT DOCUMENTS

KR 10-2011-0073239 A 6/2011
KR 10-2013-0079839 A 7/2013
(Continued)

*Primary Examiner* — Liang Che A Wang
(74) *Attorney, Agent, or Firm* — Birch, Stewart, Kolasch & Birch, LLP

(57) ABSTRACT

The present invention relates to a method and an apparatus for establishing a Wi-Fi Direct connection through Bluetooth low energy (LE) technology. According to the present invention, provided are a method including: receiving an advertising message including information associated with Wi-Fi Direct from a second device; transmitting a request message for requesting detailed information of the Wi-Fi Direct to the second device based on the advertising message; receiving a response message including the detailed information in response to the request message; and establishing the Wi-Fi Direct connection with the second device, wherein the advertising message is transmitted through a specific channel for a Bluetooth low energy (LE) connection and the information includes at least one of ID information indicating the Wi-Fi Direct, location information of the
(Continued)

detailed information, or available information of an alternative communication means, and an apparatus thereof.

16 Claims, 45 Drawing Sheets

Related U.S. Application Data filed on Oct. 22, 2014, provisional application No. 62/069,329, filed on Oct. 28, 2014, provisional application No. 62/080,383, filed on Nov. 16, 2014, provisional application No. 62/103,025, filed on Jan. 13, 2015.

(51) Int. Cl.
| | | |
|---|---|---|
| *H04W 48/14* | (2009.01) |
| *H04W 48/16* | (2009.01) |
| *H04W 48/10* | (2009.01) |
| *H04W 52/02* | (2009.01) |
| *H04W 76/18* | (2018.01) |
| *H04W 76/14* | (2018.01) |
| *H04W 4/80* | (2018.01) |
| *H04W 8/00* | (2009.01) |
| *H04W 92/18* | (2009.01) |
| *H04W 36/14* | (2009.01) |
| *H04W 84/18* | (2009.01) |

(52) U.S. Cl.
CPC ........... *H04W 36/03* (2018.08); *H04W 48/10* (2013.01); *H04W 48/14* (2013.01); *H04W 48/16* (2013.01); *H04W 52/02* (2013.01); *H04W 52/028* (2013.01); *H04W 76/10* (2018.02); *H04W 76/14* (2018.02); *H04W 76/18* (2018.02); *H04W 92/18* (2013.01); *H04W 36/14* (2013.01); *H04W 84/18* (2013.01); *Y02D 70/00* (2018.01); *Y02D 70/10* (2018.01); *Y02D 70/14* (2018.01); *Y02D 70/142* (2018.01); *Y02D 70/144* (2018.01); *Y02D 70/162* (2018.01); *Y02D 70/166* (2018.01); *Y02D 70/168* (2018.01); *Y02D 70/22* (2018.01)

(58) Field of Classification Search
CPC ..... H04W 36/03; H04W 8/005; H04W 48/10; H04W 48/14; H04W 48/16
USPC ................................. 709/217, 227, 228, 229
See application file for complete search history.

(56) References Cited

U.S. PATENT DOCUMENTS

| | | | |
|---|---|---|---|
| 2012/0069894 A1* | 3/2012 | Sakimura | H04N 7/163 375/240.02 |
| 2013/0170482 A1 | 7/2013 | Jung | |
| 2014/0026068 A1 | 1/2014 | Park et al. | |
| 2014/0153557 A1 | 6/2014 | Kim | |
| 2014/0302842 A1* | 10/2014 | Lloyd | H04L 41/0806 455/426.1 |
| 2014/0378058 A1* | 12/2014 | Decuir | H04W 4/80 455/41.2 |
| 2015/0358363 A1* | 12/2015 | Park | H04L 12/12 709/227 |

FOREIGN PATENT DOCUMENTS

| | | |
|---|---|---|
| KR | 10-2014-0011857 A | 1/2014 |
| KR | 10-2014-0071784 A | 6/2014 |

* cited by examiner

[FIG 1]
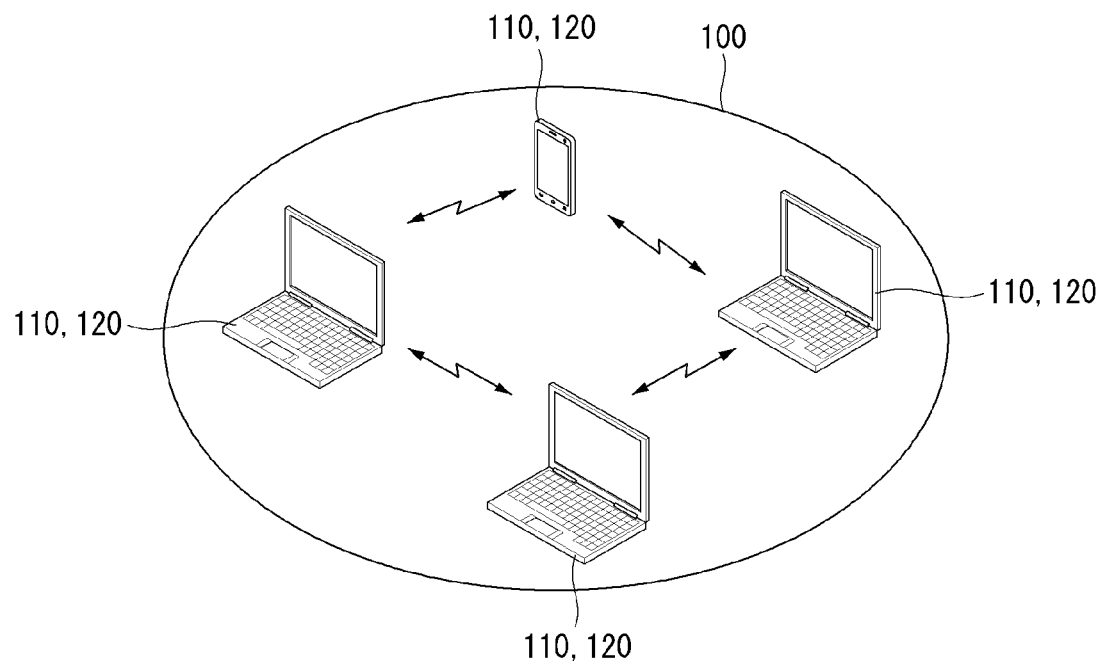

[FIG. 2]
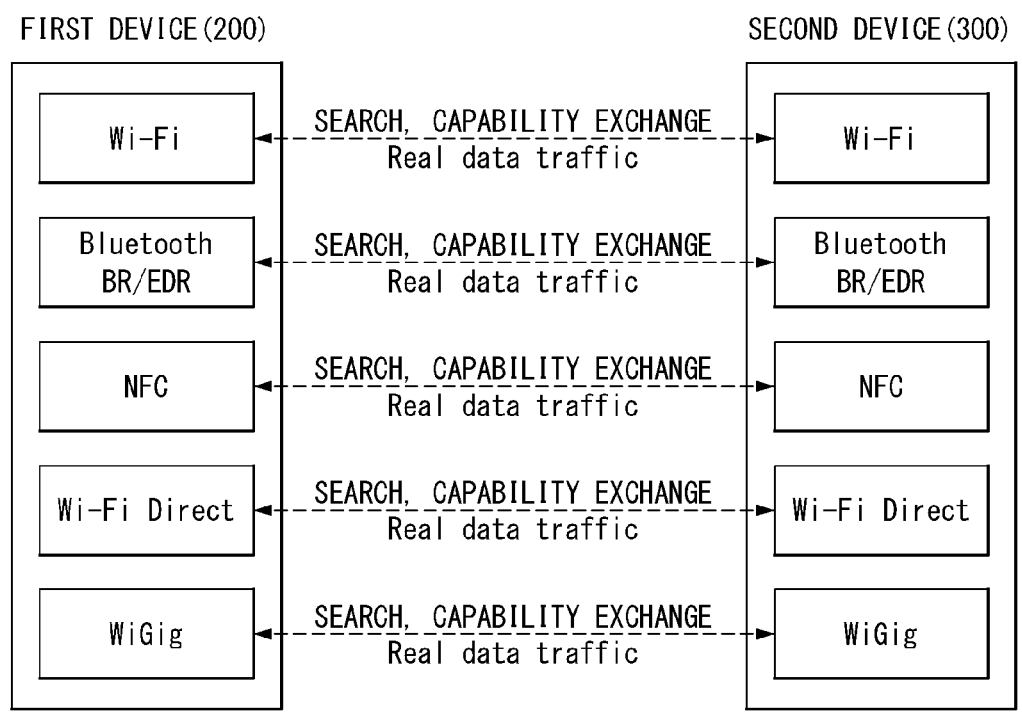

[FIG. 3]
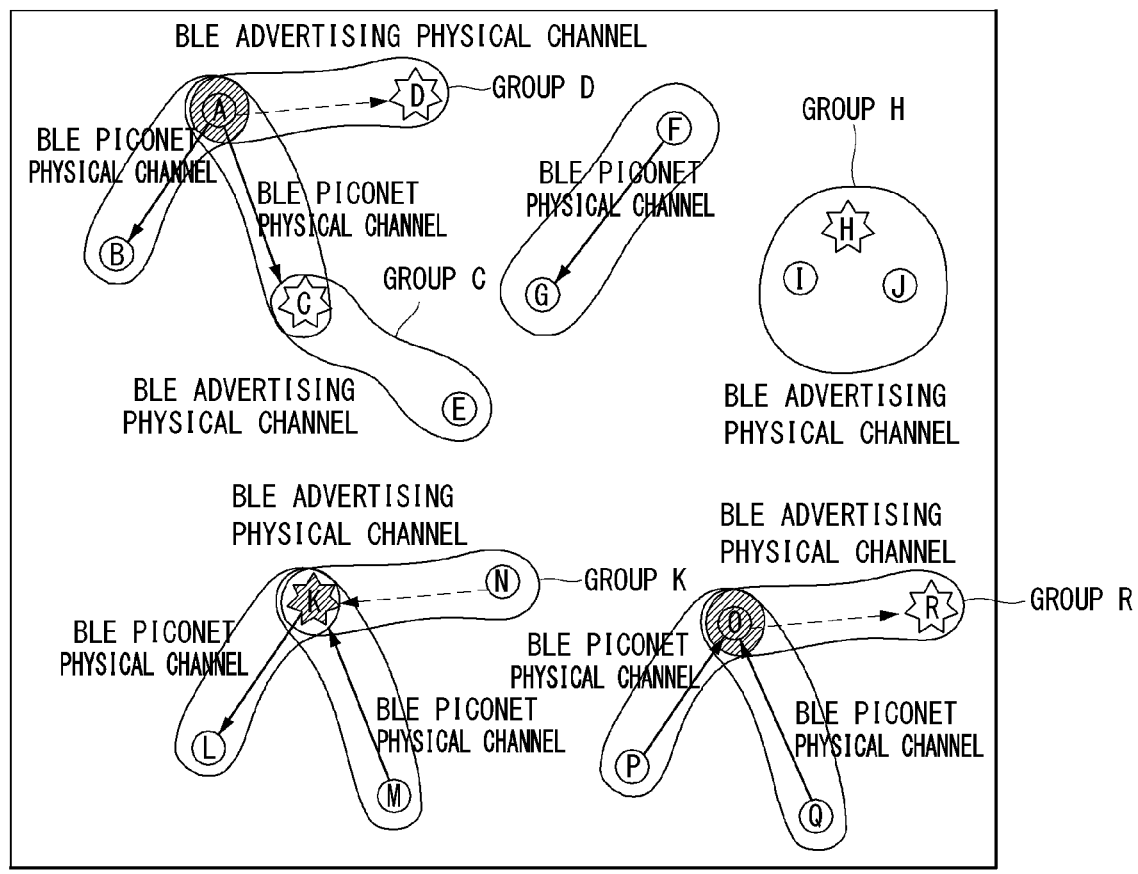

[FIG. 4]
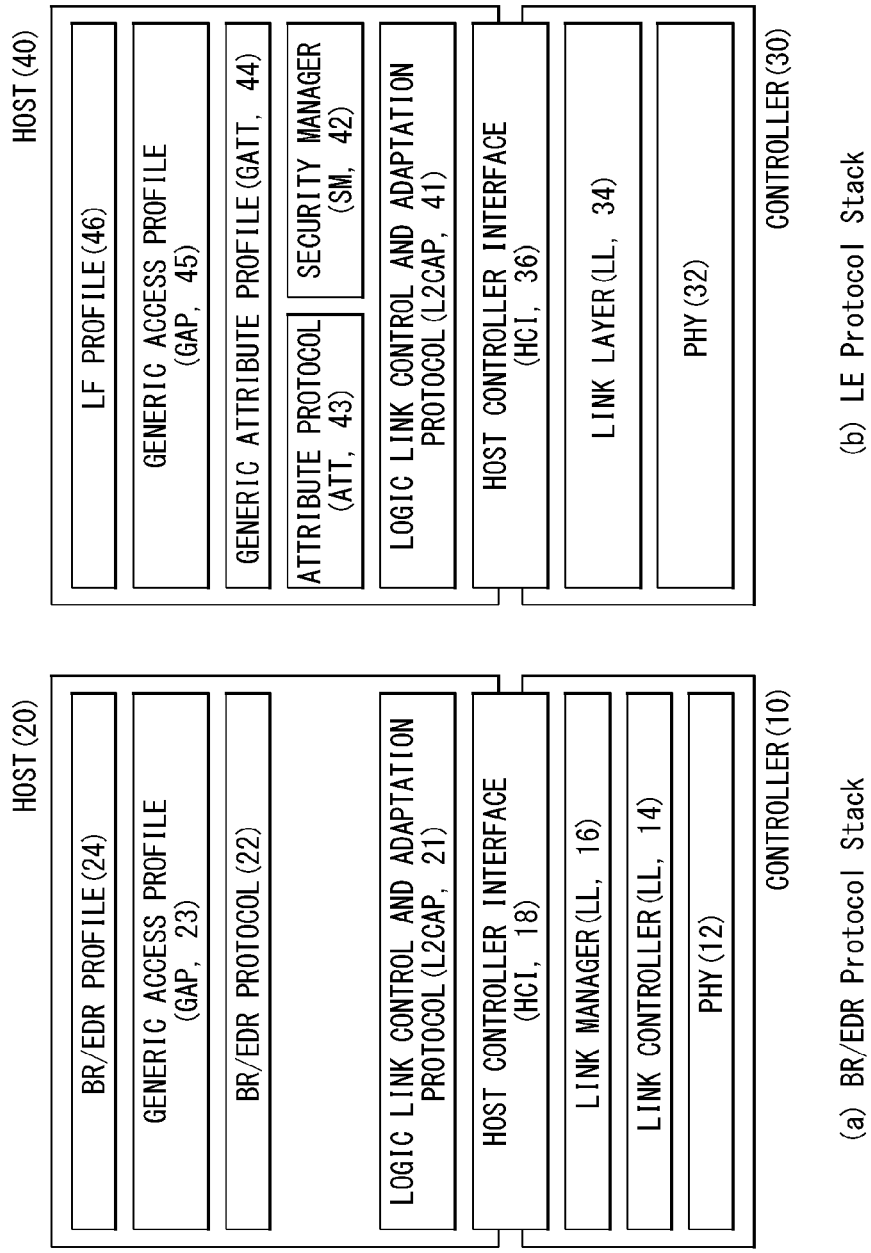

[FIG 5]
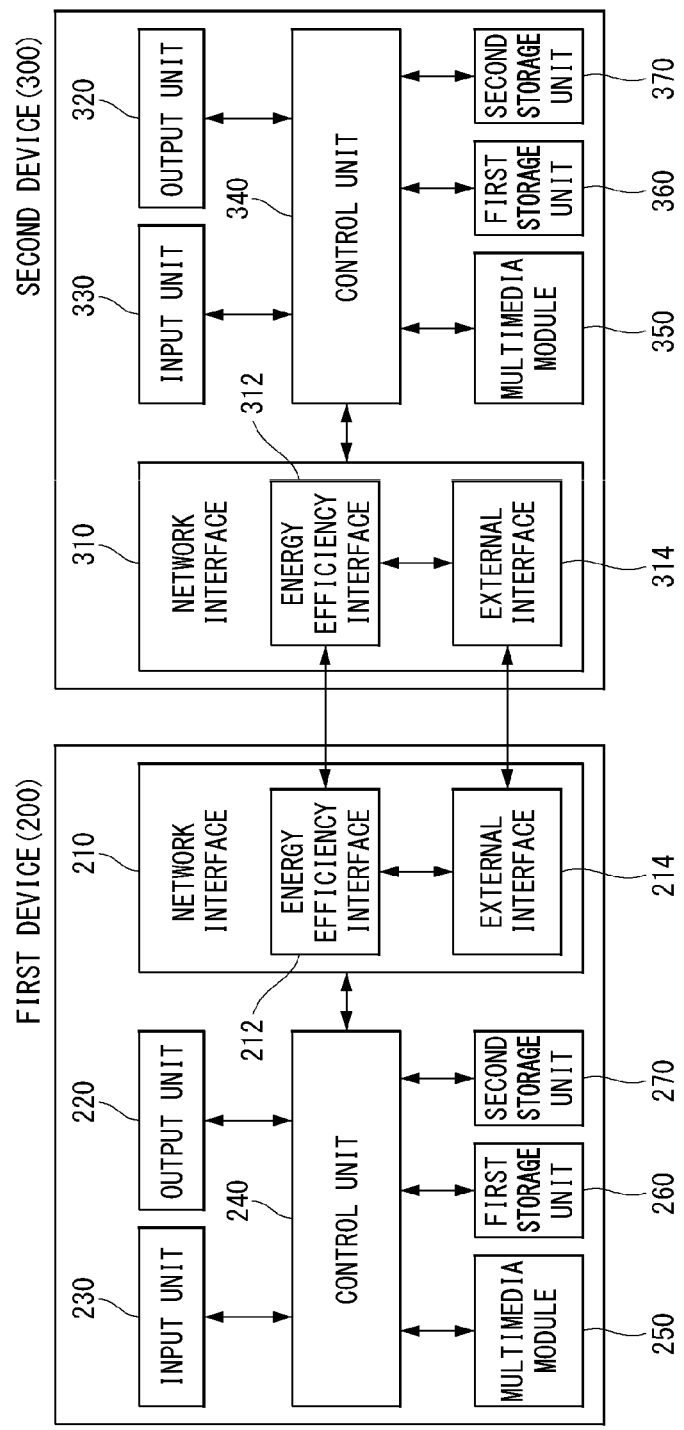

[FIG. 6]
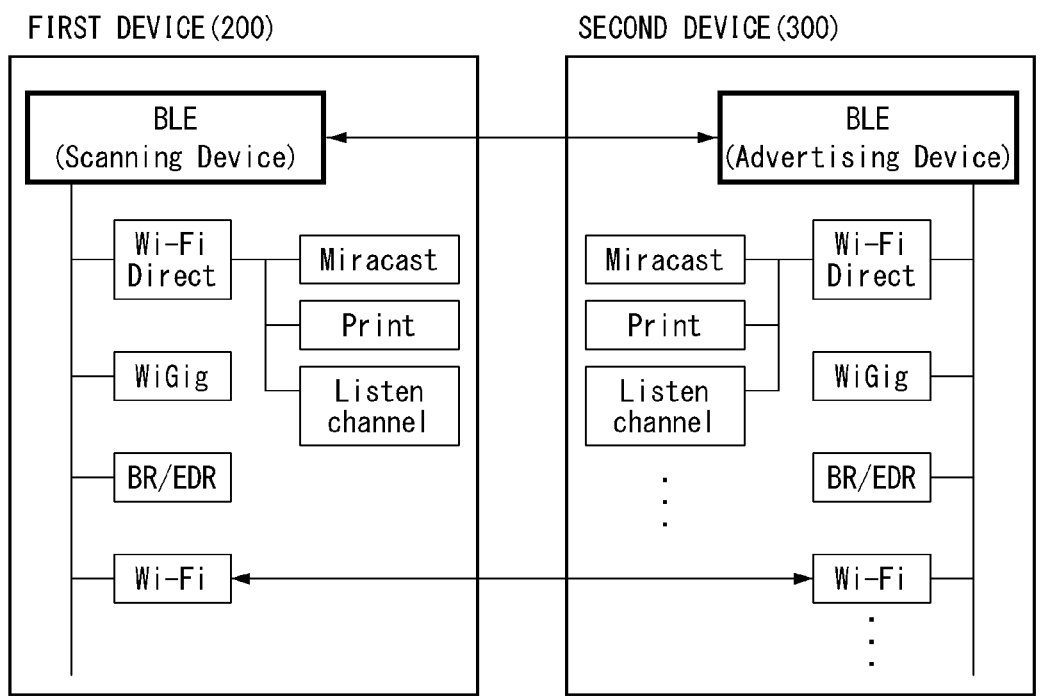

[FIG. 7]
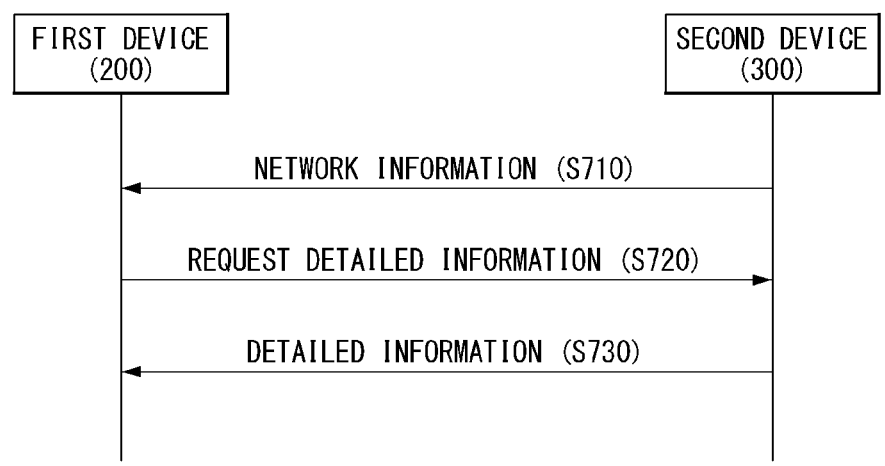

[FIG 8]

| INFORMATION TYPE #1 | DETAILED INFORMATION #1 | . . . | INFORMATION TYPE #n | DETAILED INFORMATION #n |
|---|---|---|---|---|

[FIG 9]
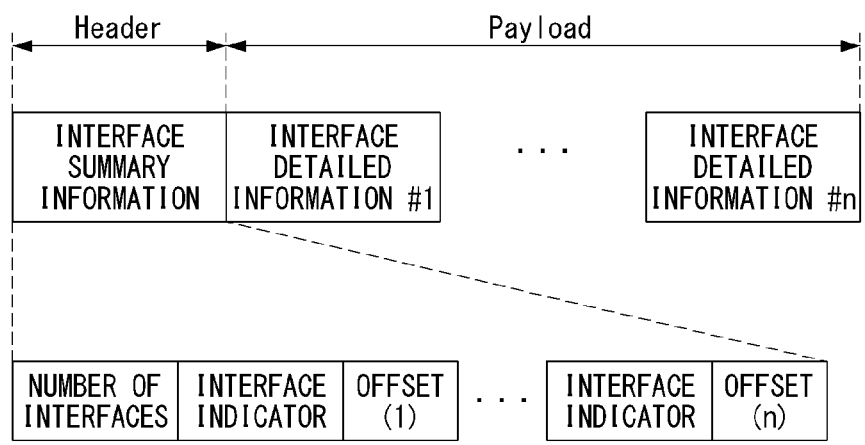

[FIG. 10]
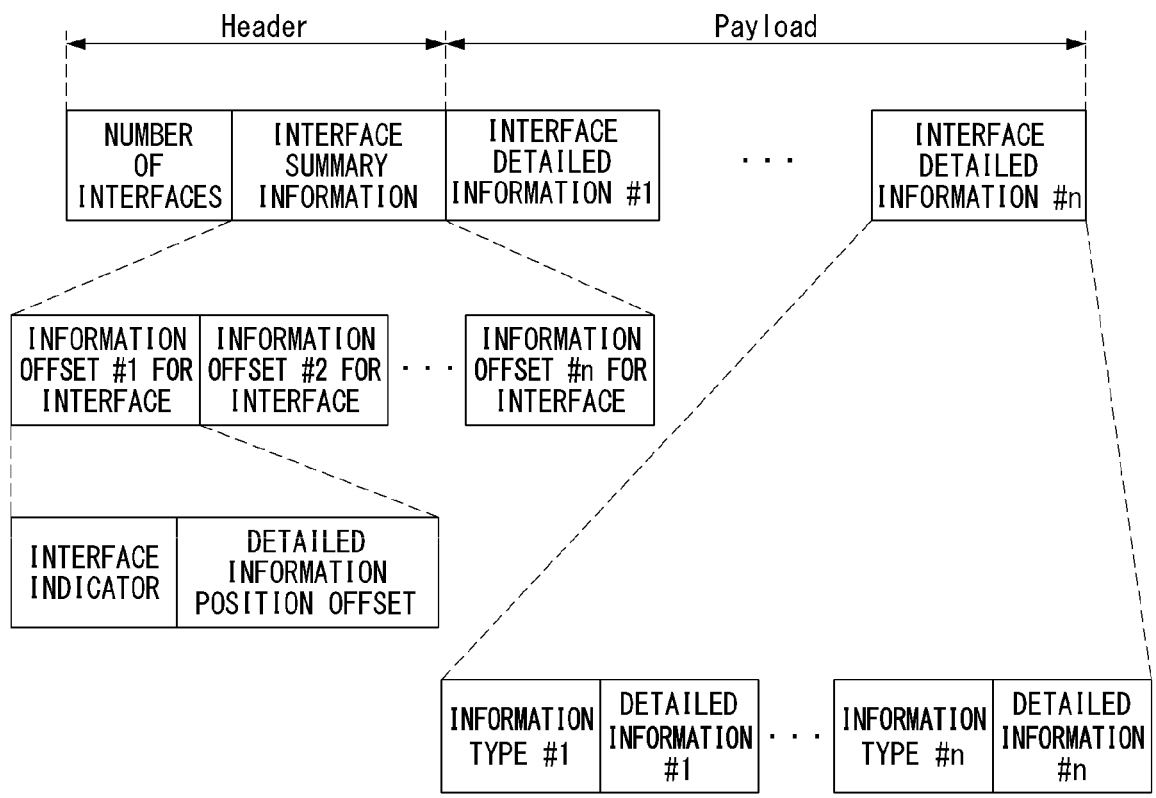

[FIG. 11]
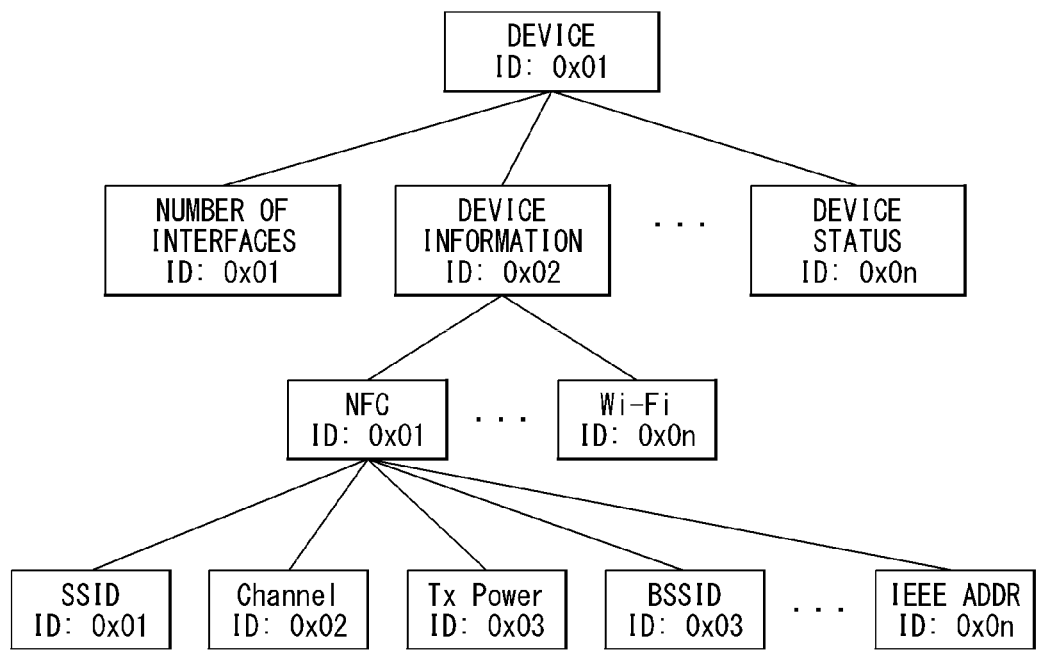

[FIG. 12]
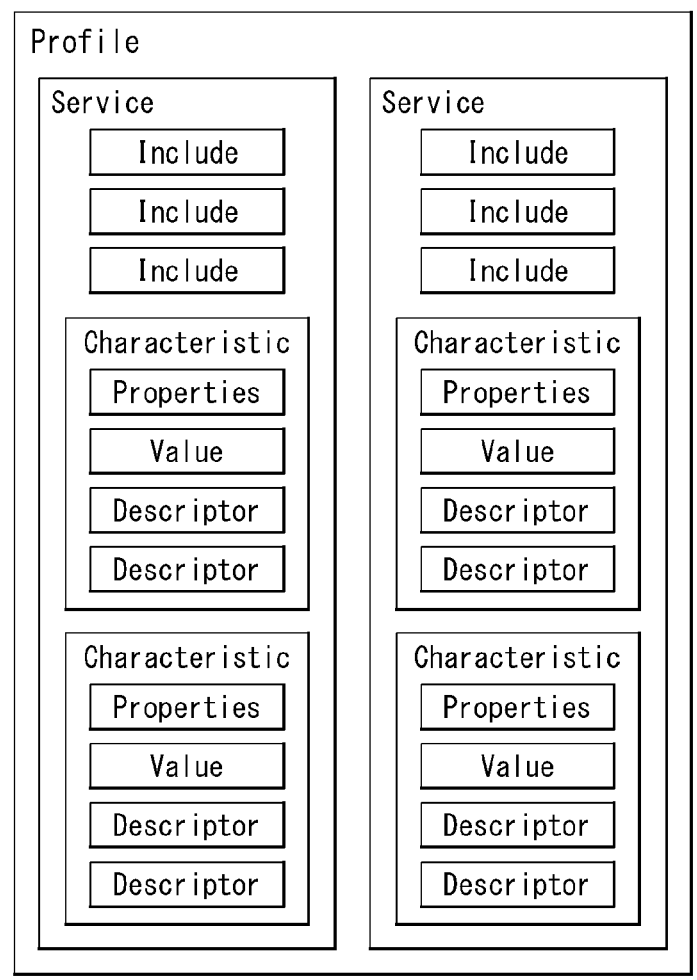

[FIG. 13]

Service Definition

Service Declaration

Attribute Handle
Attribute Type = <<Primary Service>>
Attribute Value = Service UUID (Service name)
Attribute Permission = Read Only, No Authentication/Authorization Characteristic Definition Attribute Handle
Attribute Type = <<Characteristic>>
Attribute Value
  - Characteristic Properties
  - Characteristic Value Attribute Handle
  - Characteristic UUID = <<Characteristic name>>
Attribute Permission = Read Only, No Authentication/Authorization Characteristic Value Declaration Attribute Handle
Attribute Type = <<Characteristic name>>
Attribute Value = Characteristic value
Attribute Permission = Read Only, No Authentication/Authorization

[FIG. 14]
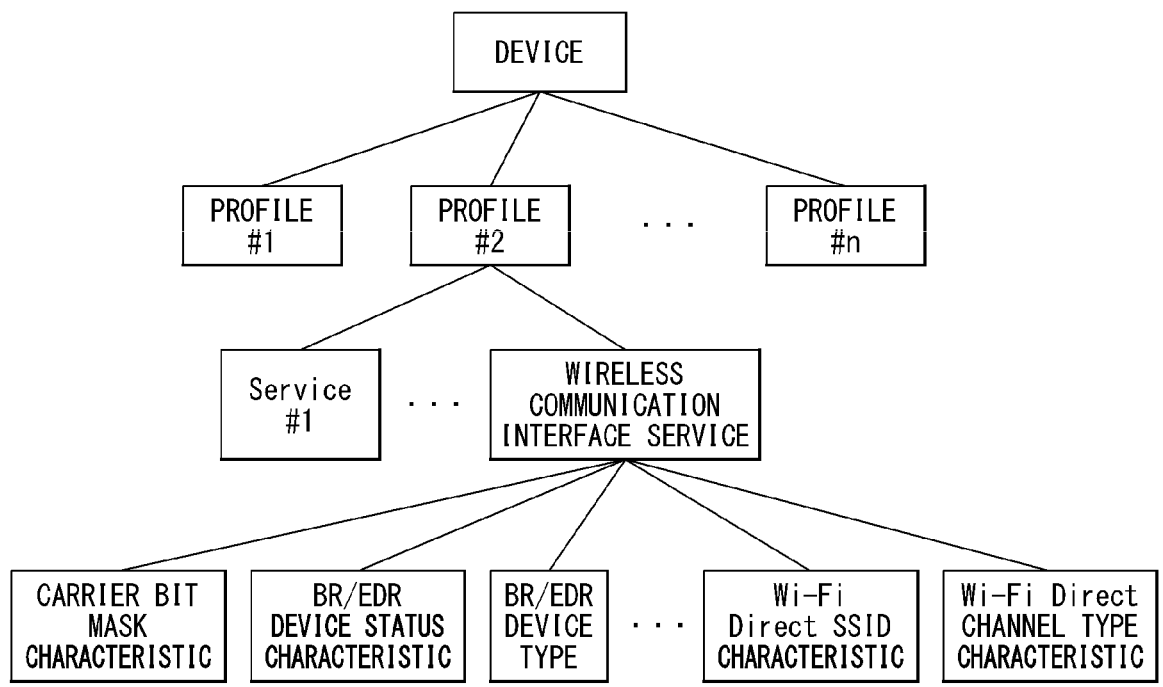

[FIG. 15]
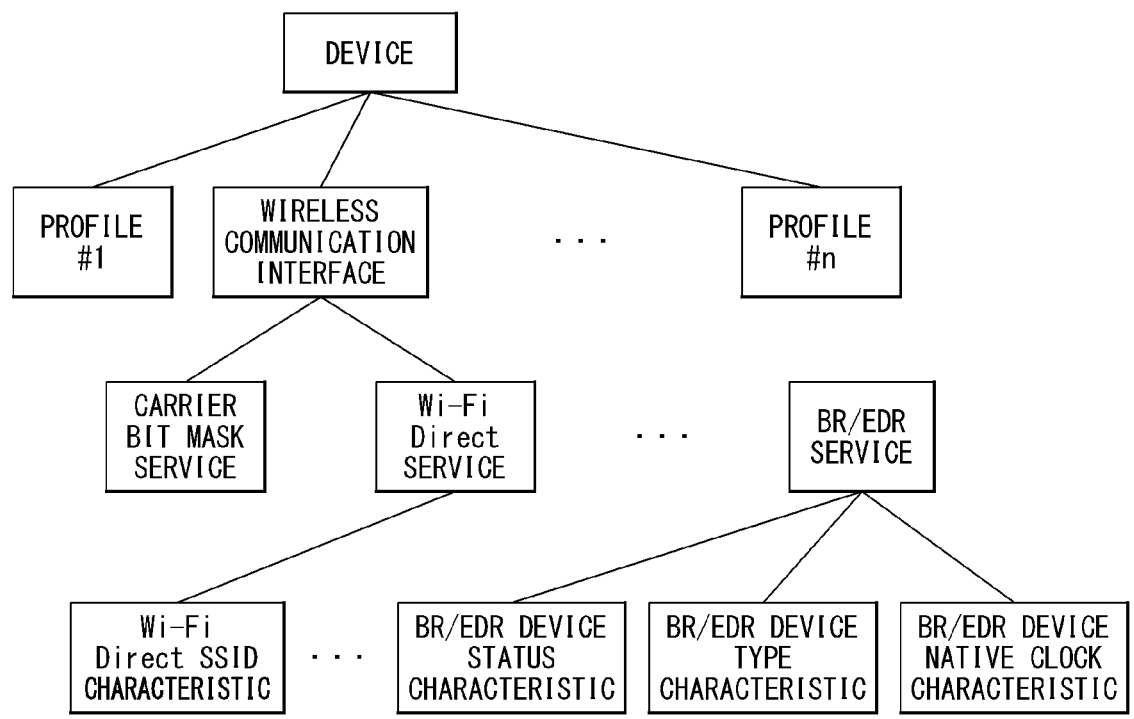

[FIG 16]
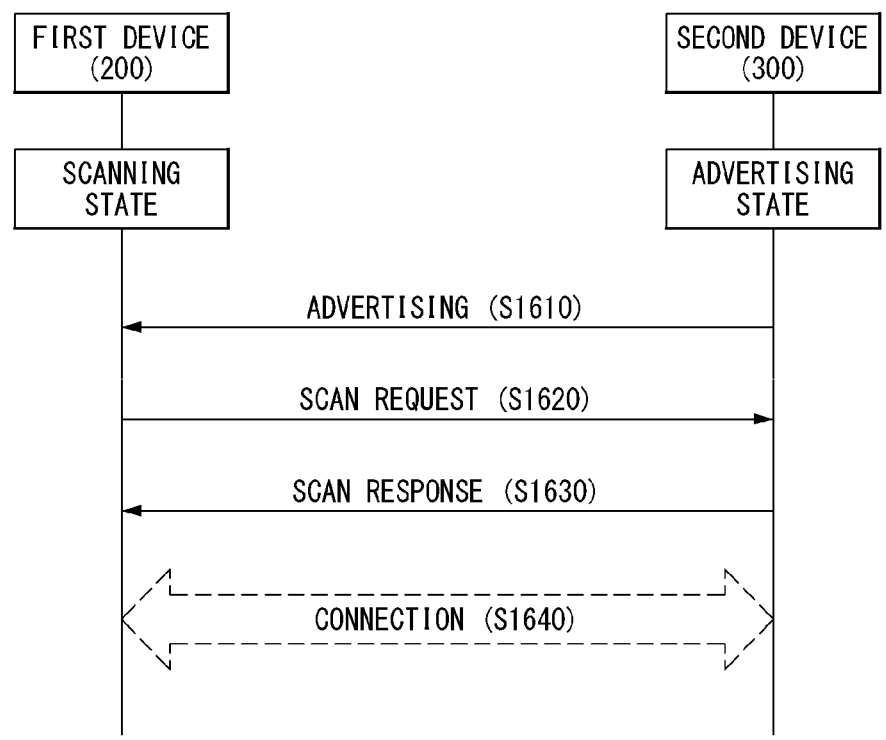

[FIG. 17]
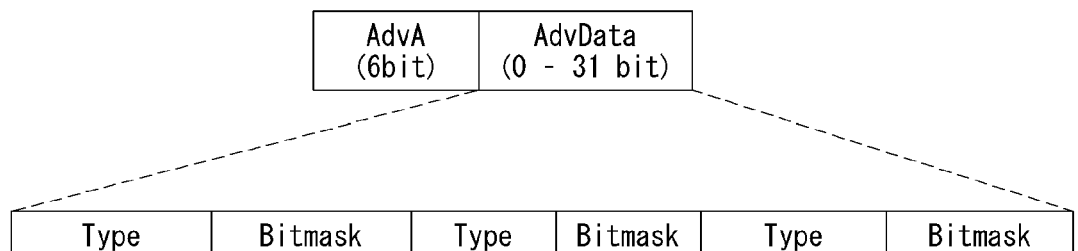
(a) ADVERTISIGN MESSAGE
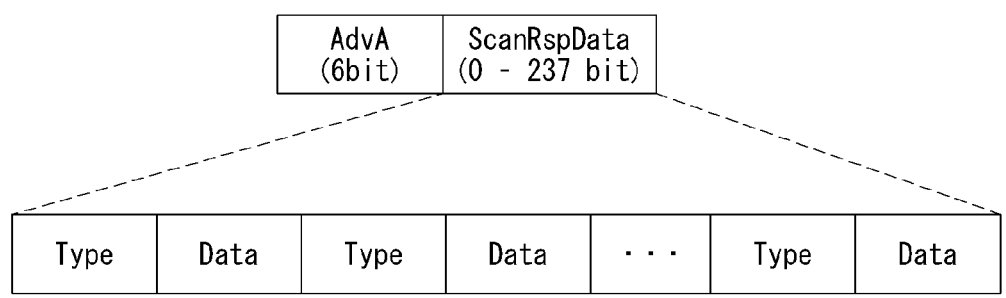
(b) SCAN RESPONSE

[FIG 18]
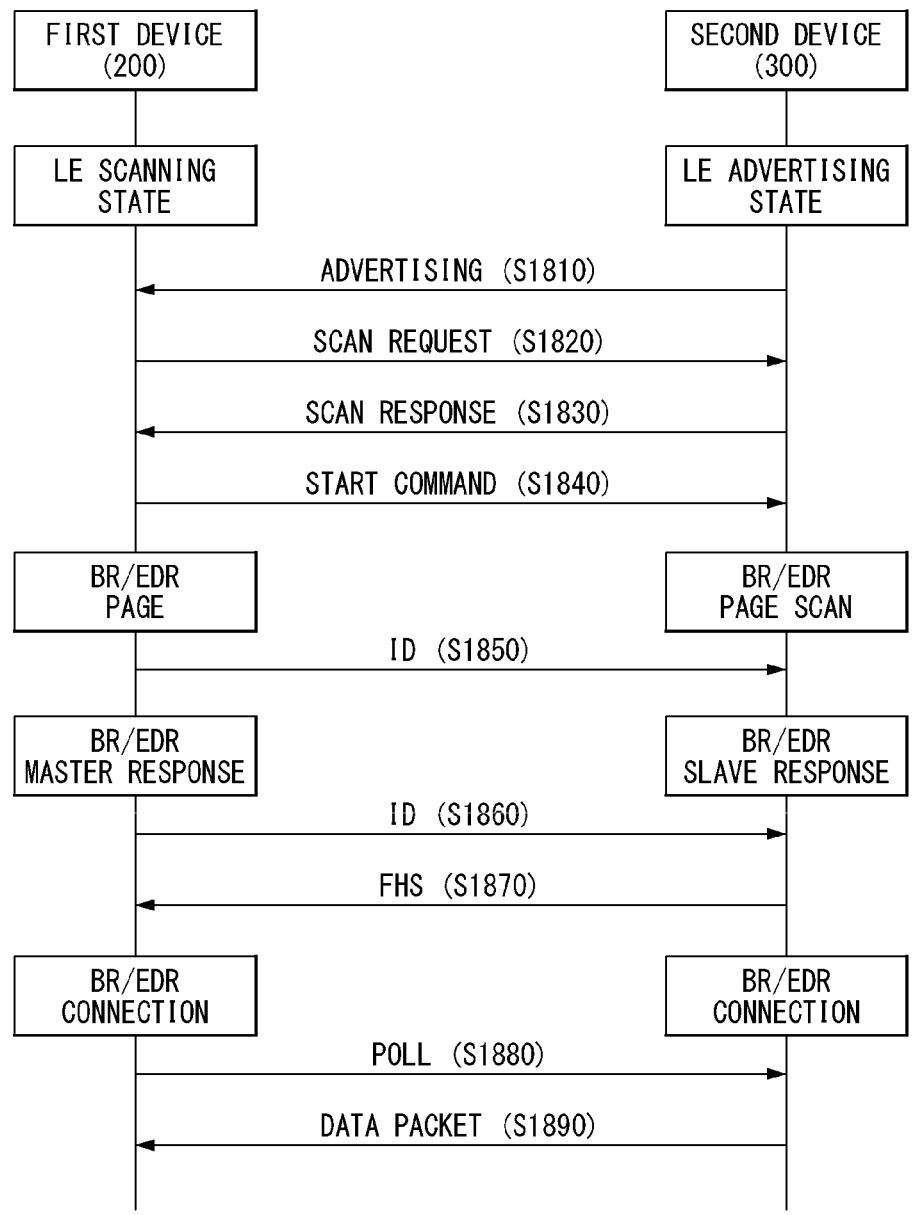

[FIG. 19]
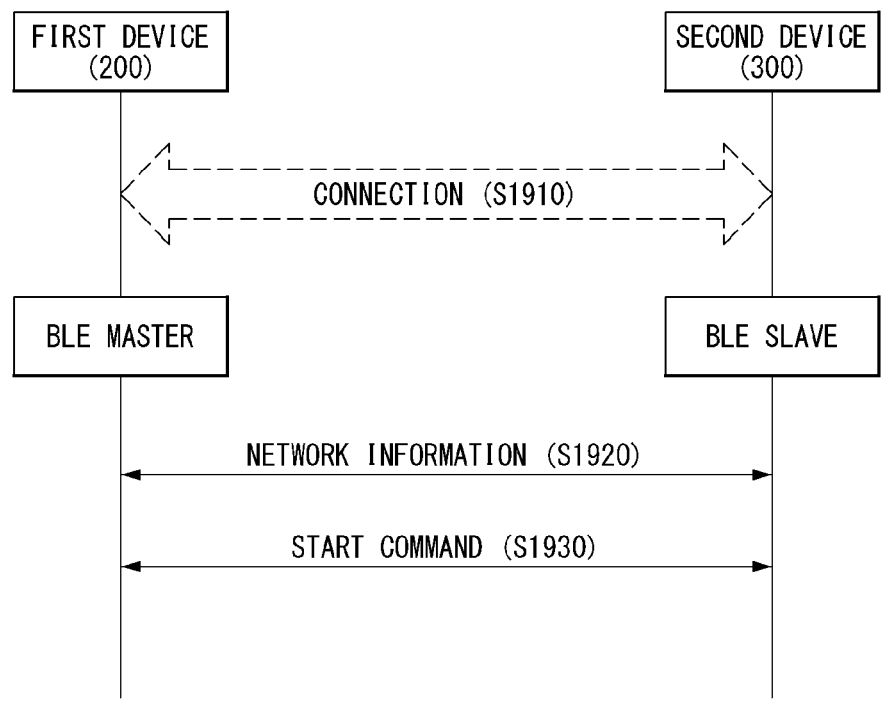

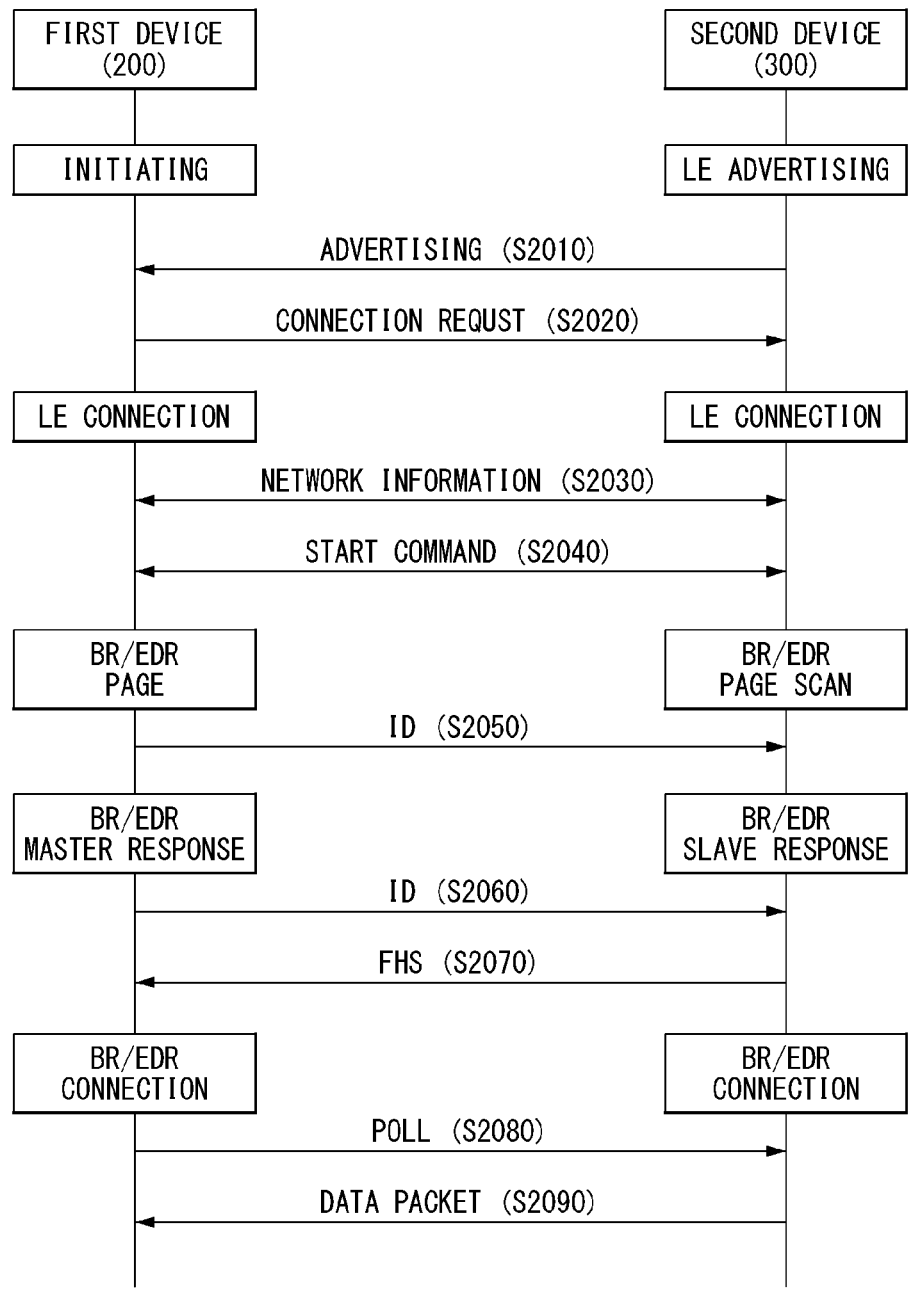
[FIG. 20]

[FIG. 21]
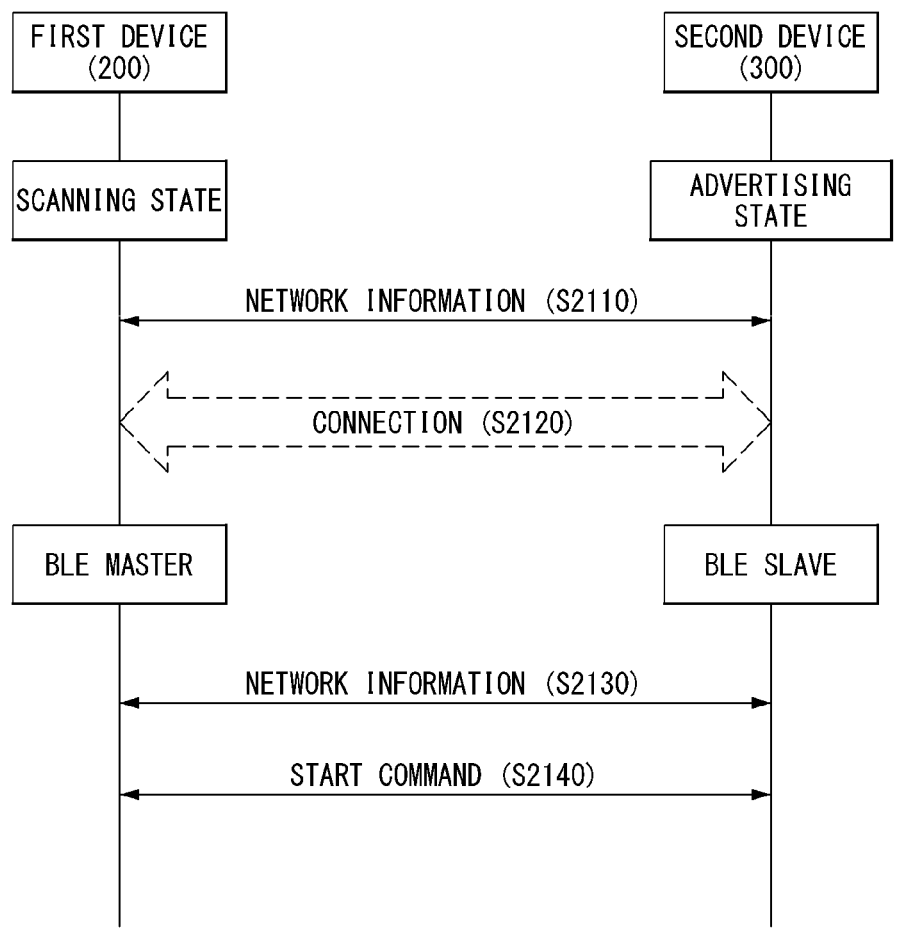

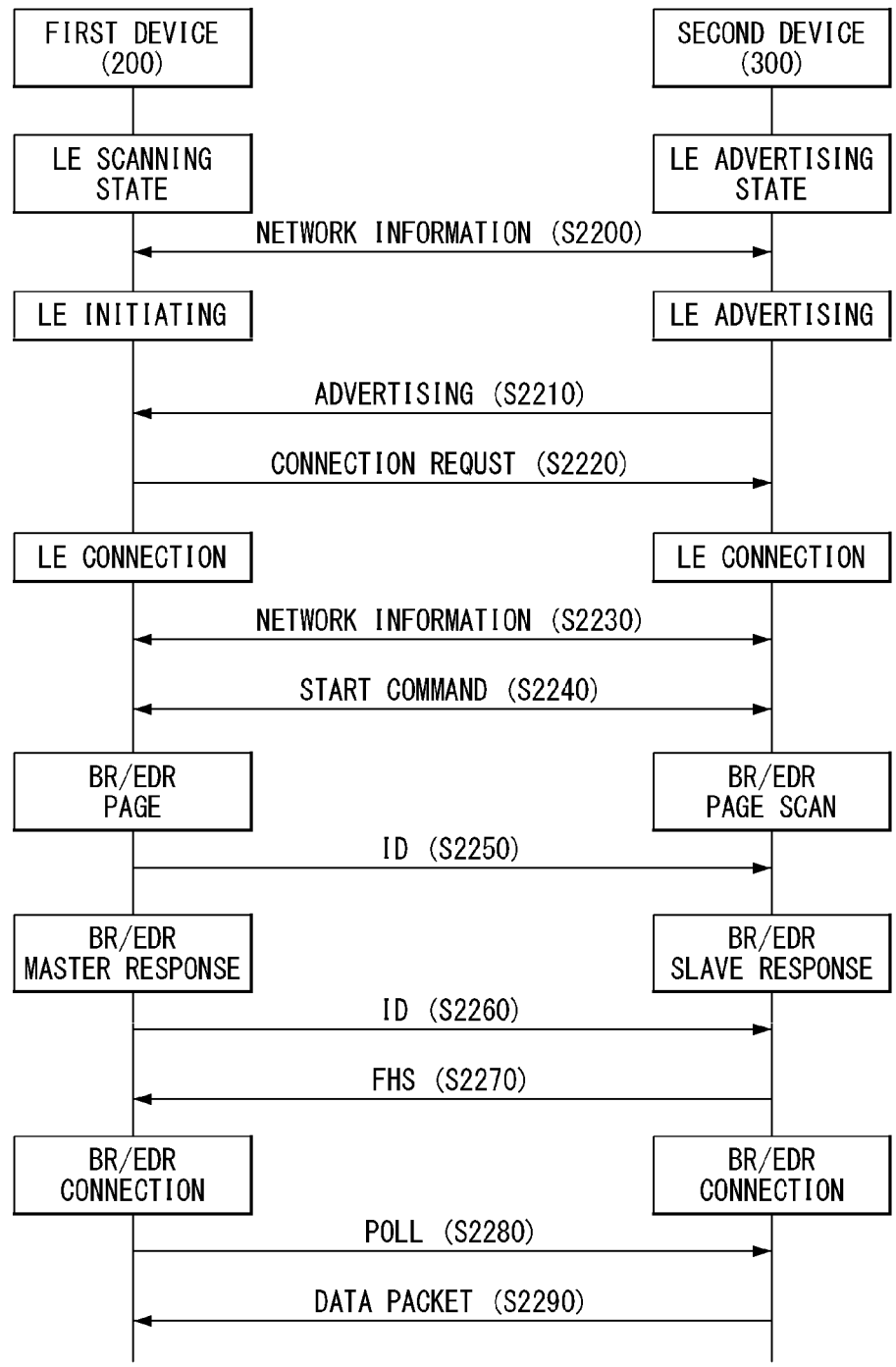
[FIG. 22]

[FIG 23]
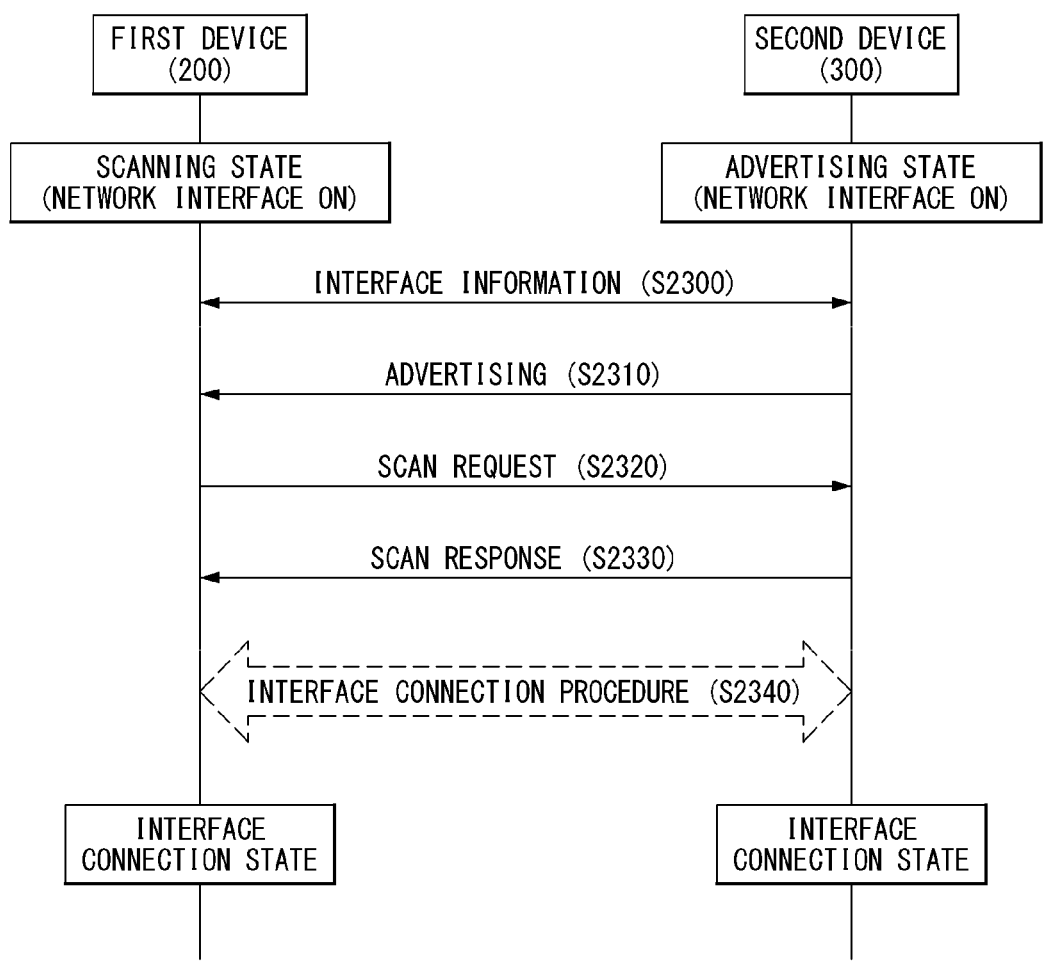

[FIG. 24]
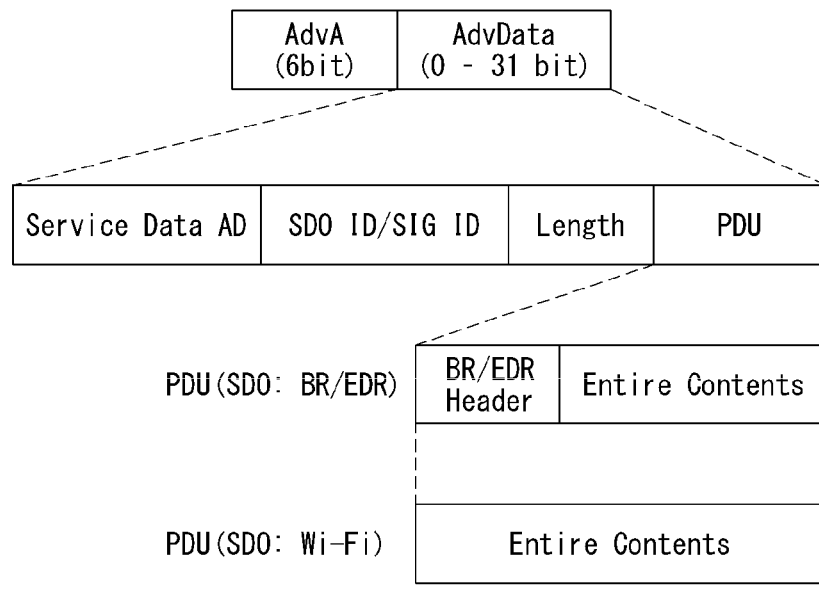
(a) ADVERTISING MESSAGE
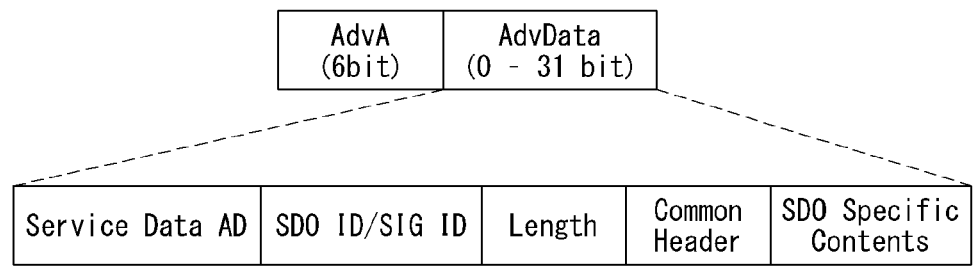
(b) ADVERTISING MESSAGE

[FIG 25]
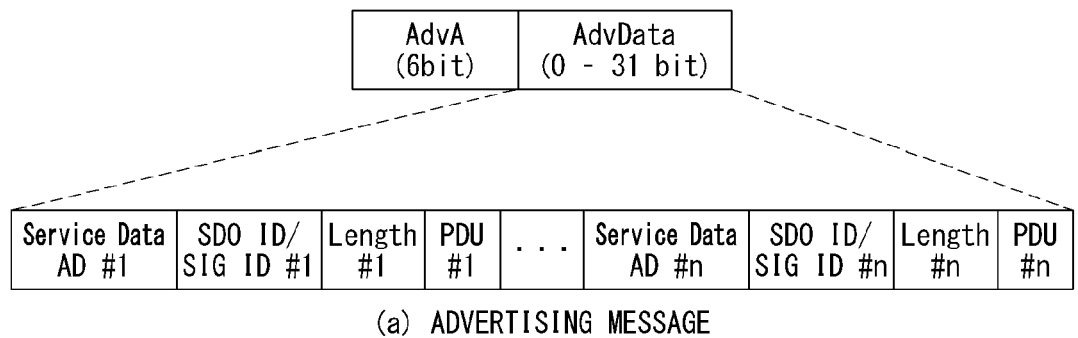
(a) ADVERTISING MESSAGE
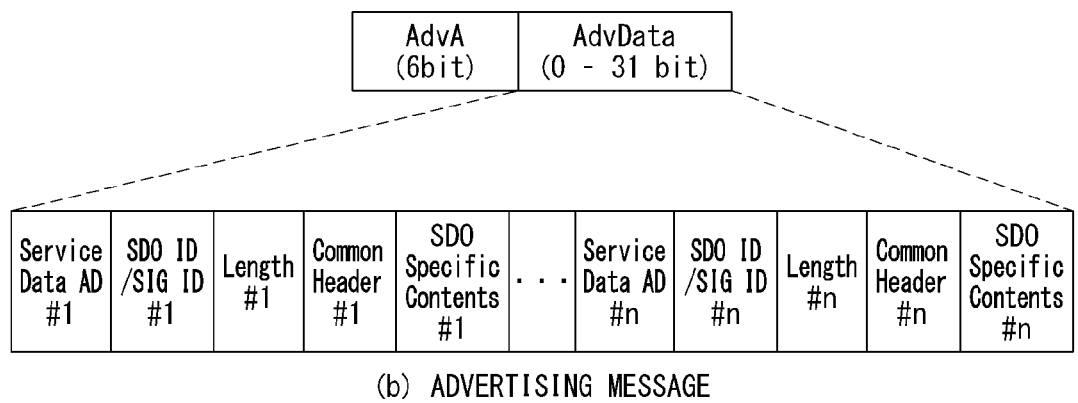
(b) ADVERTISING MESSAGE

[FIG 26]
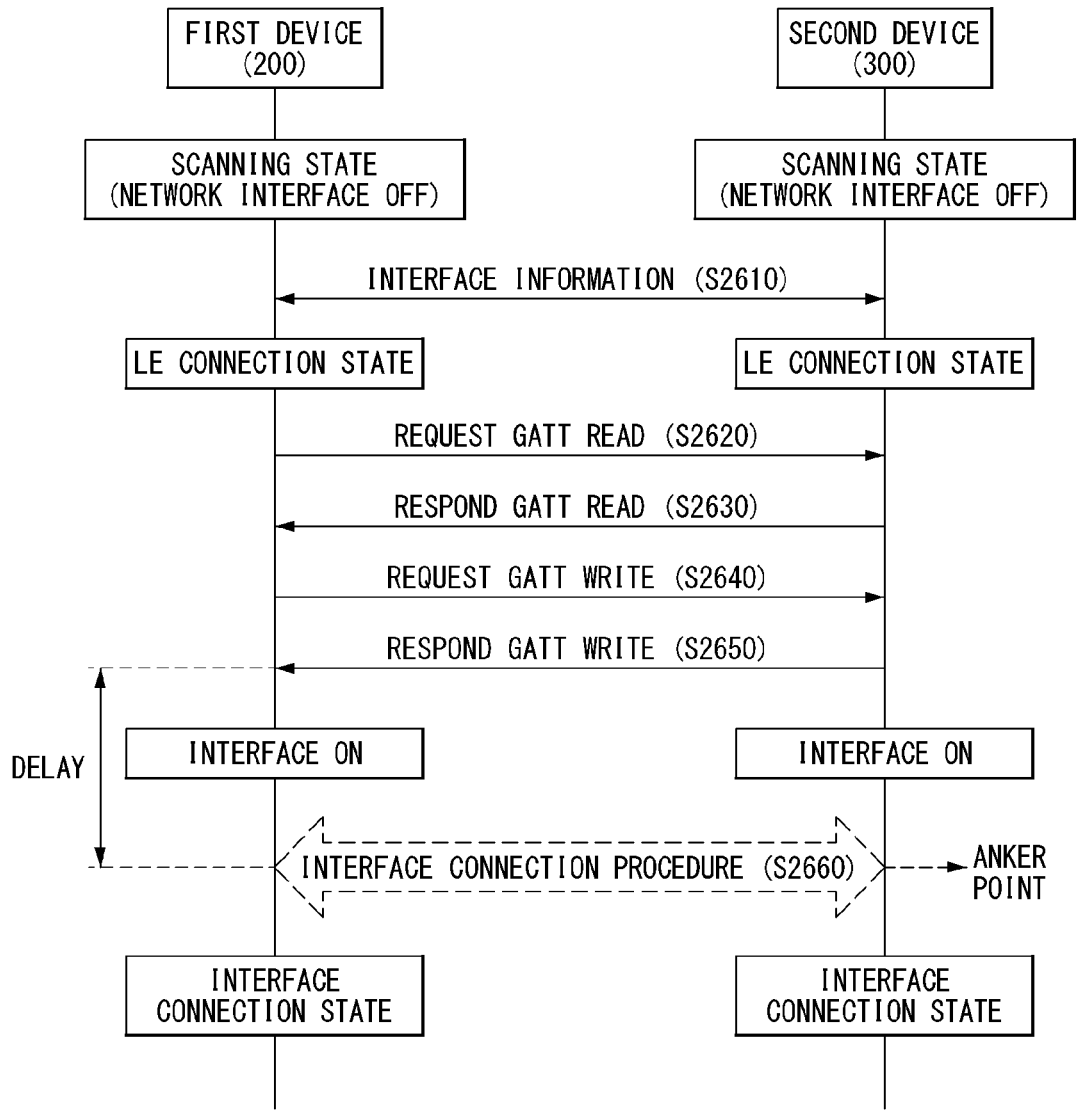

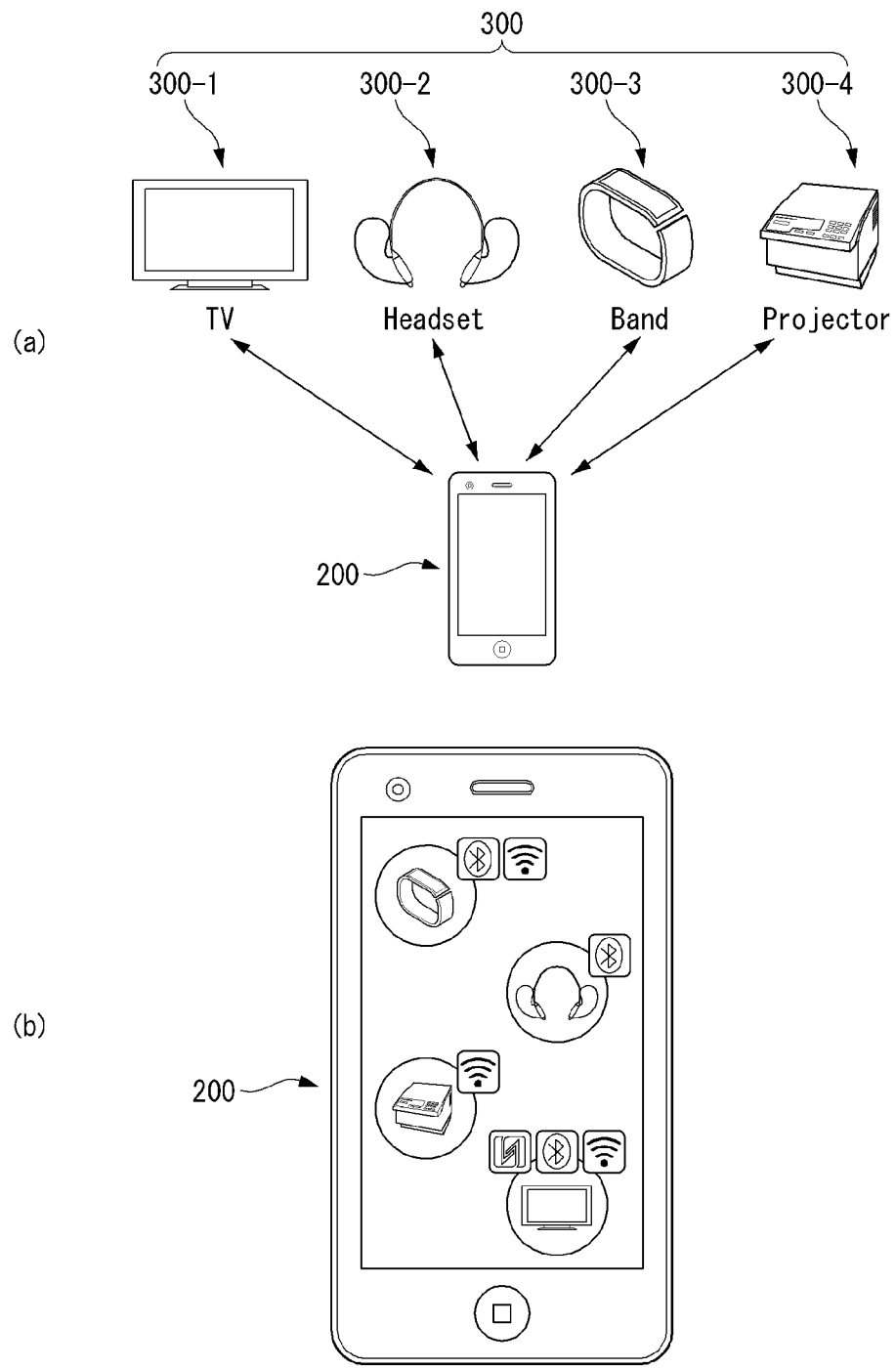
[FIG. 27]

[FIG 28]
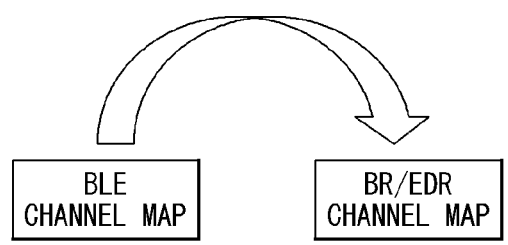
(a)
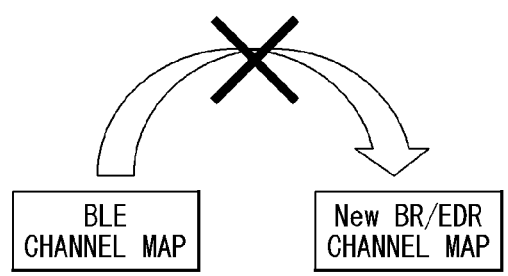
(b)

[FIG. 29]
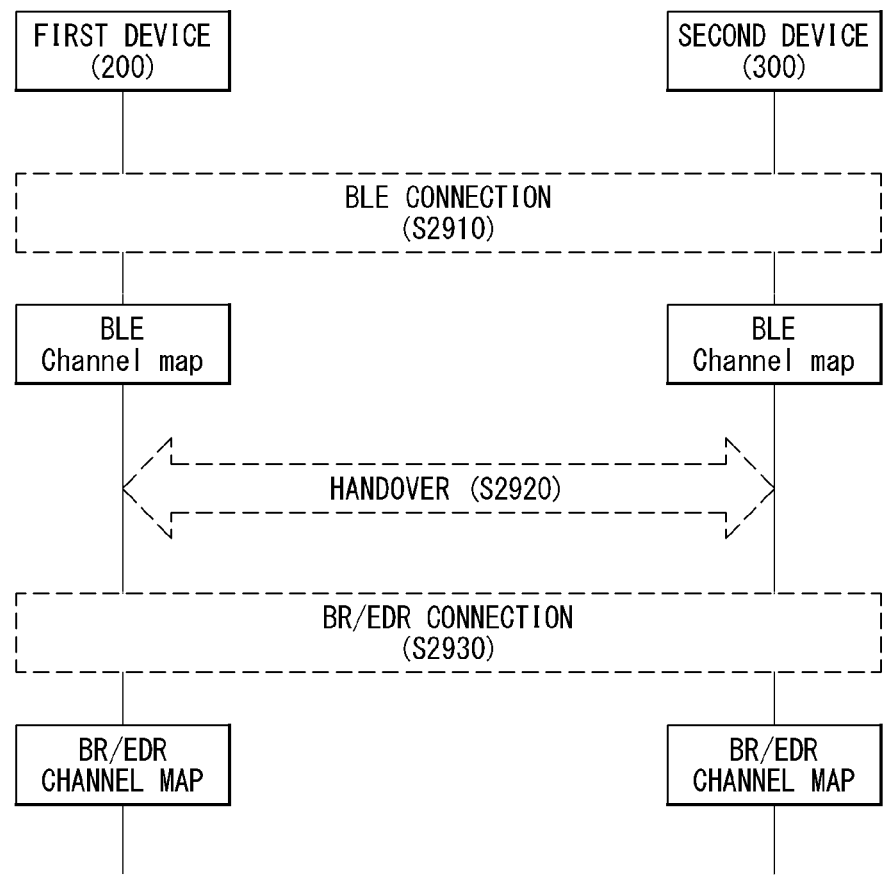

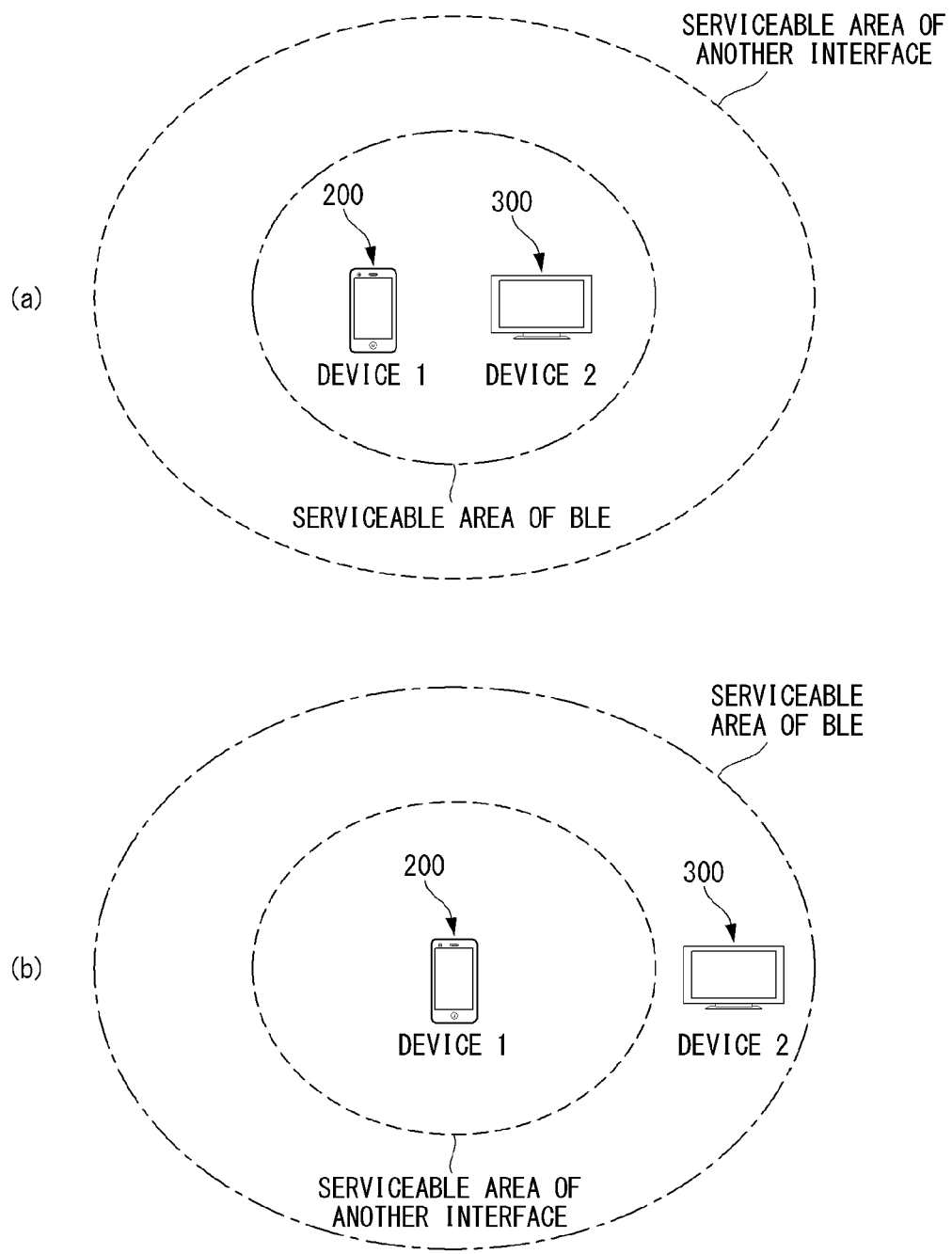

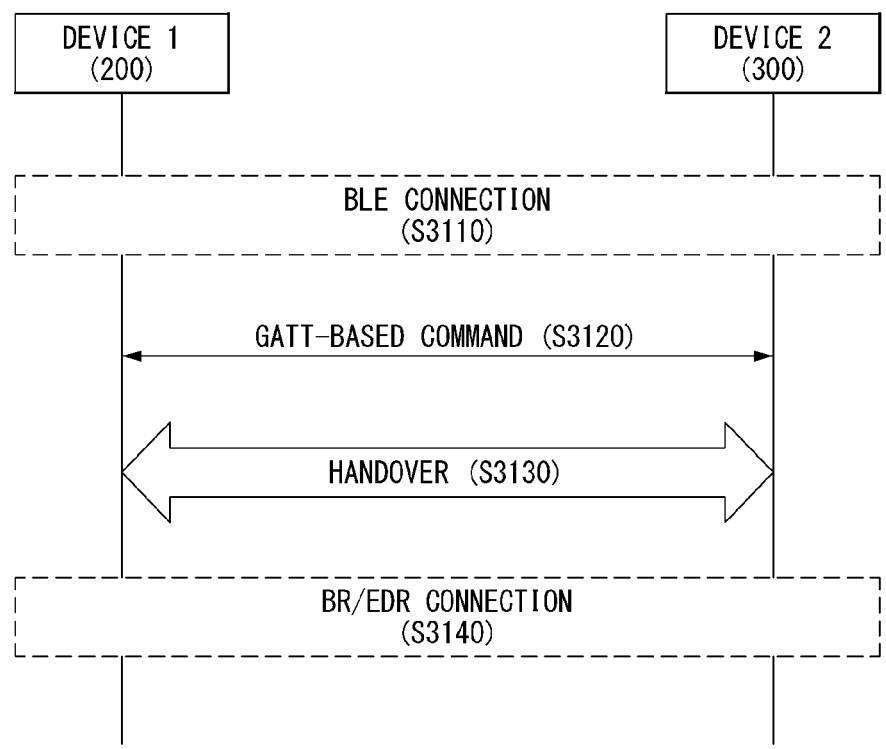
[FIG 31]

[FIG 32]
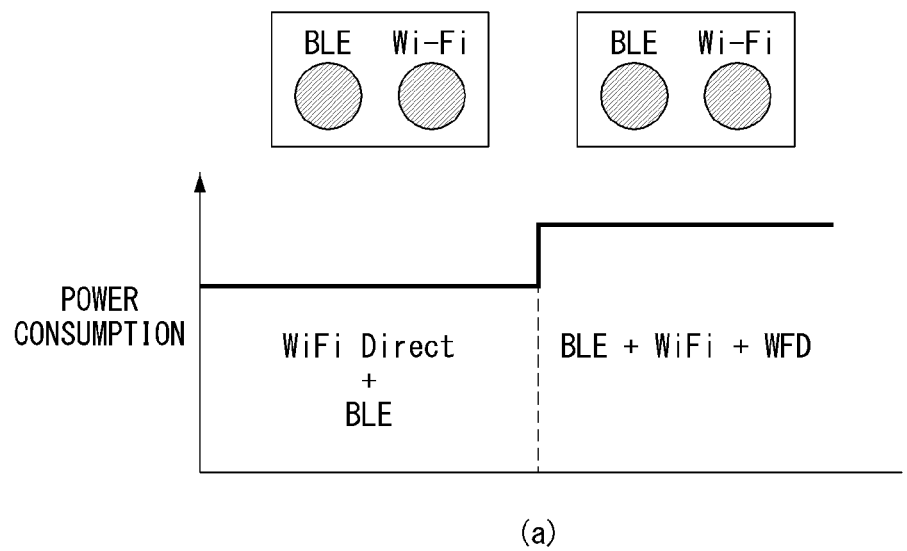
(a)
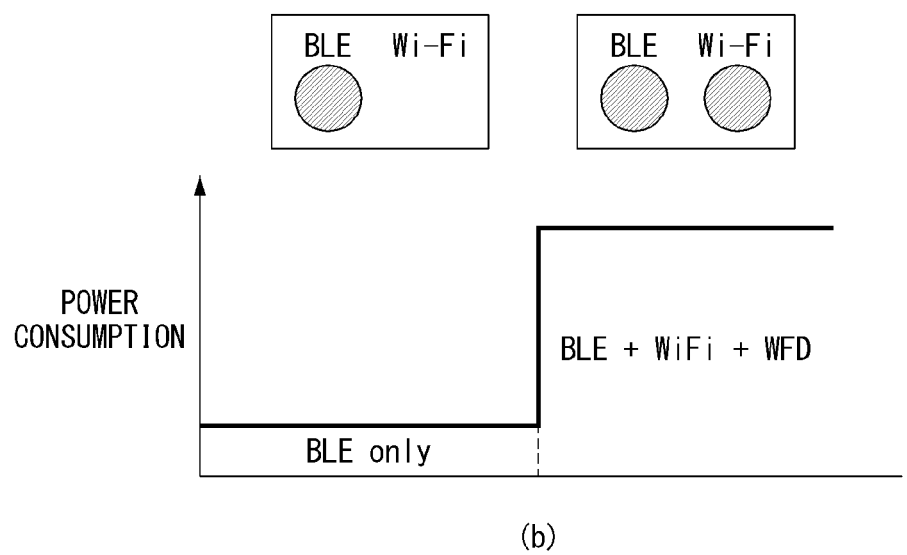
(b)

[FIG 33]
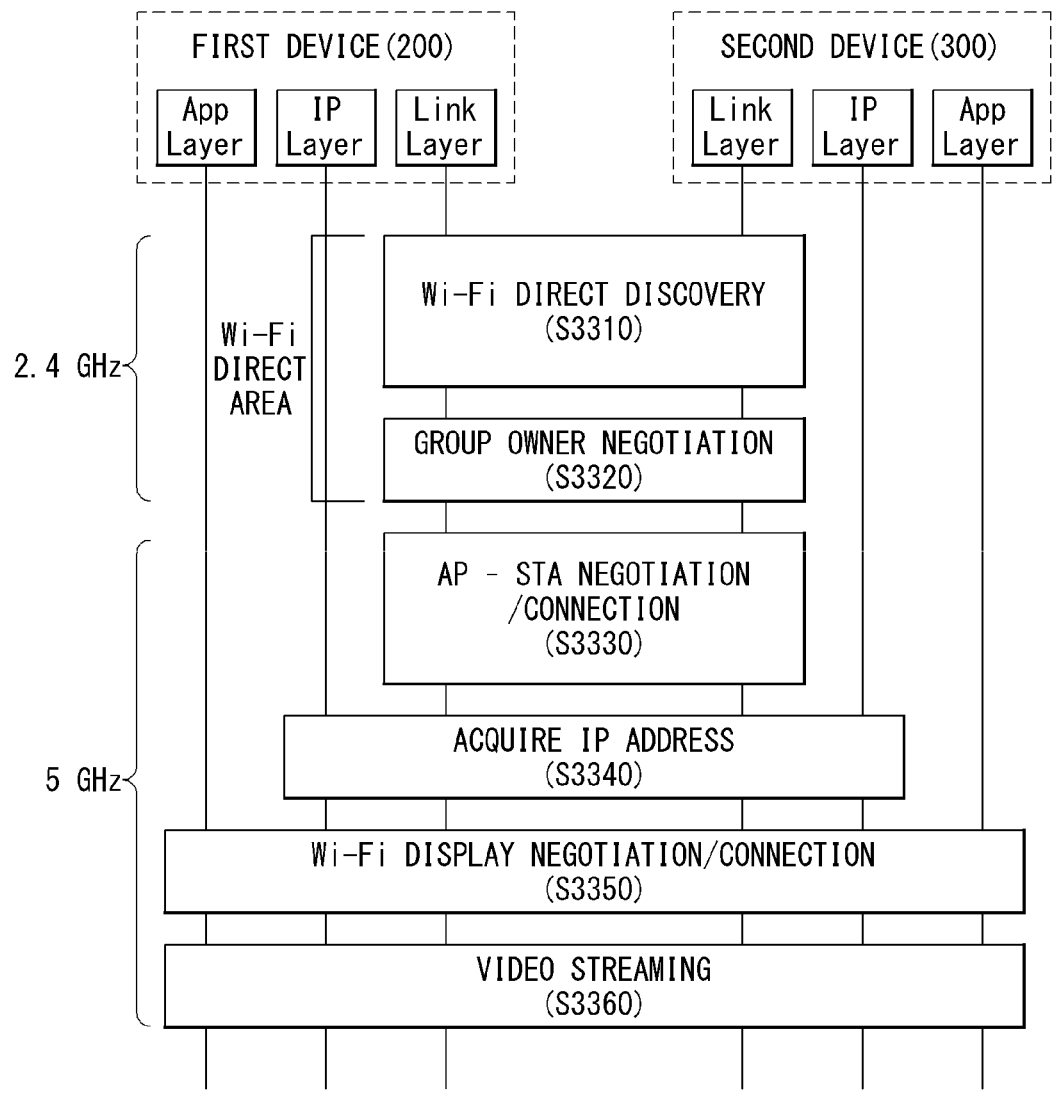

[FIG. 34]
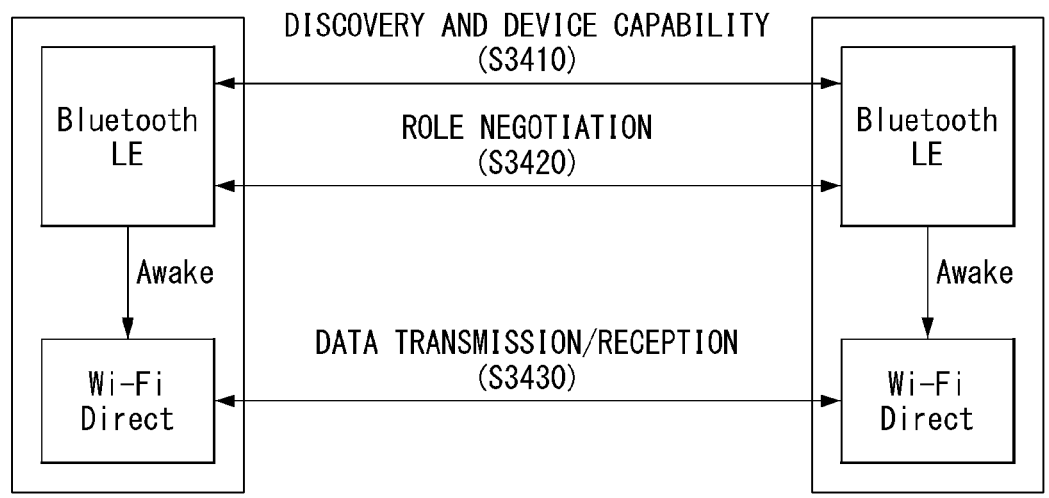

[FIG 35]
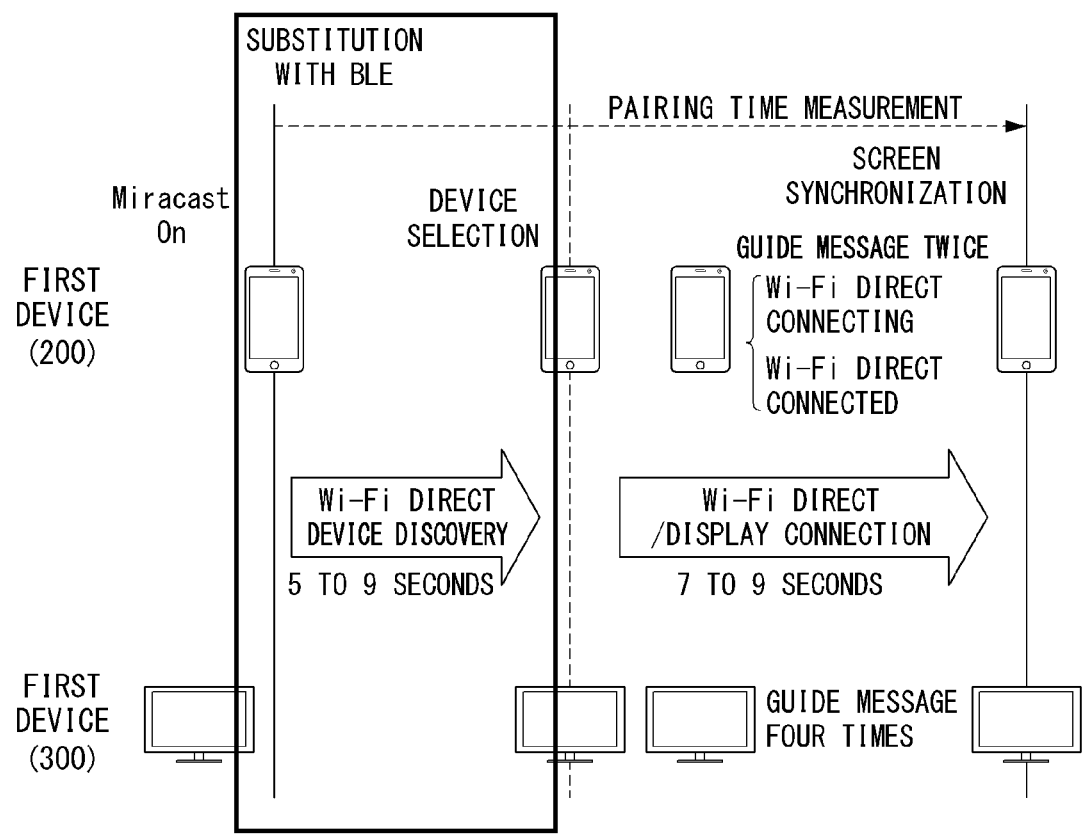

[FIG 36]
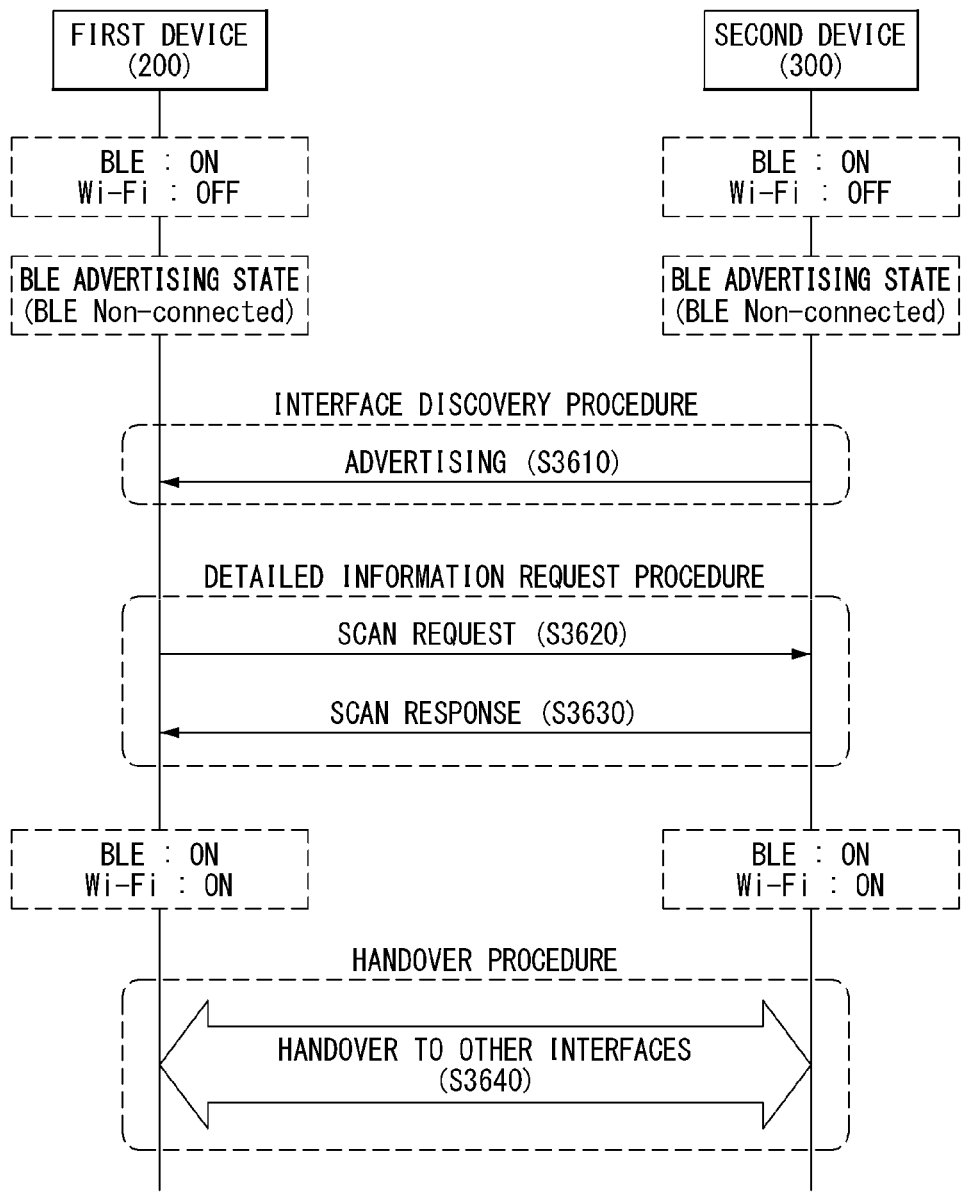

[FIG 37]
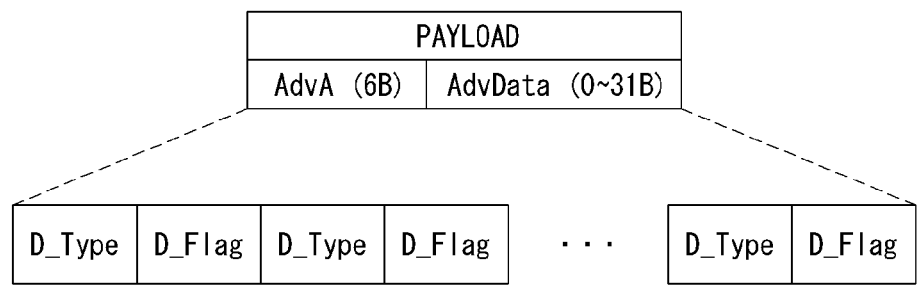

[FIG. 38]
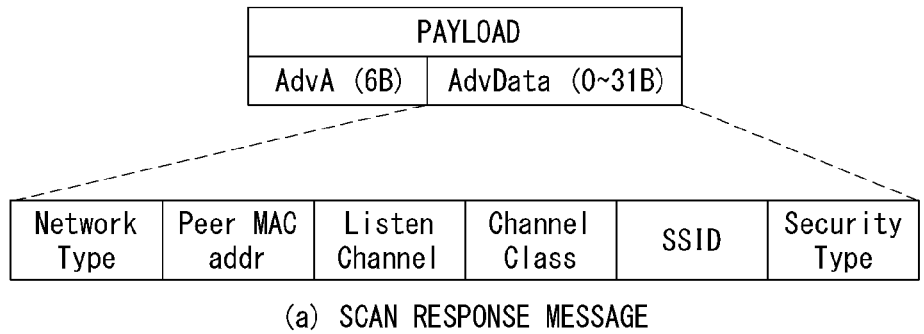
(a) SCAN RESPONSE MESSAGE
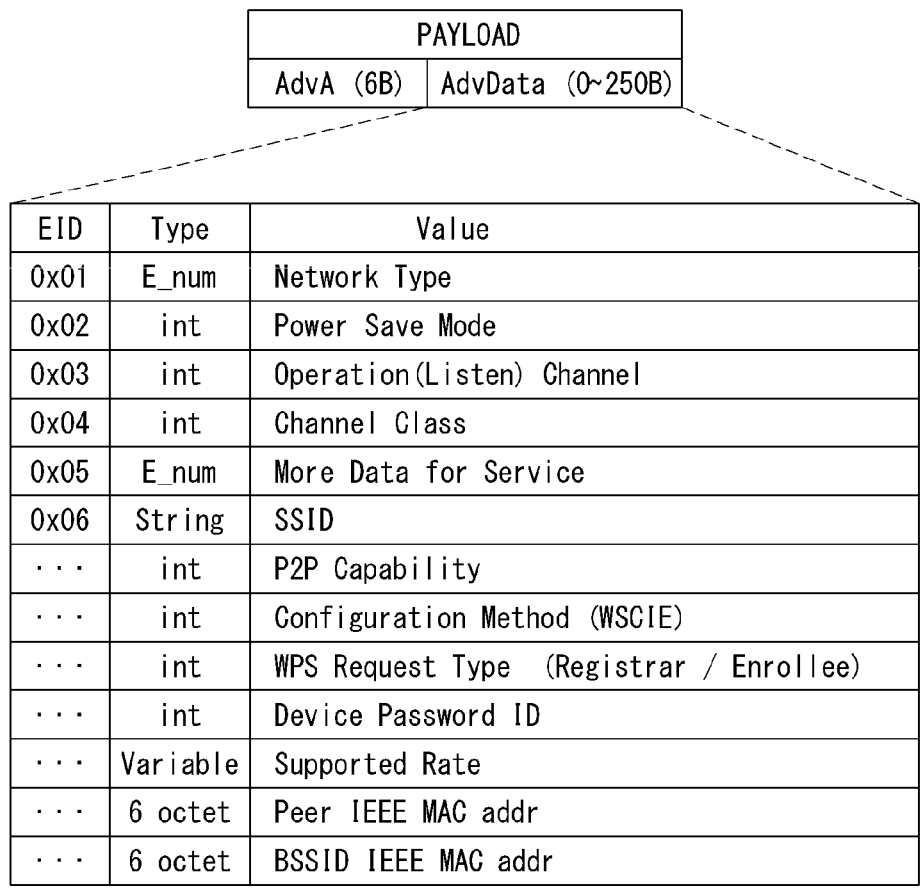
(b) EXTENDED SCAN RESPONSE MESSAGE

[FIG. 39]
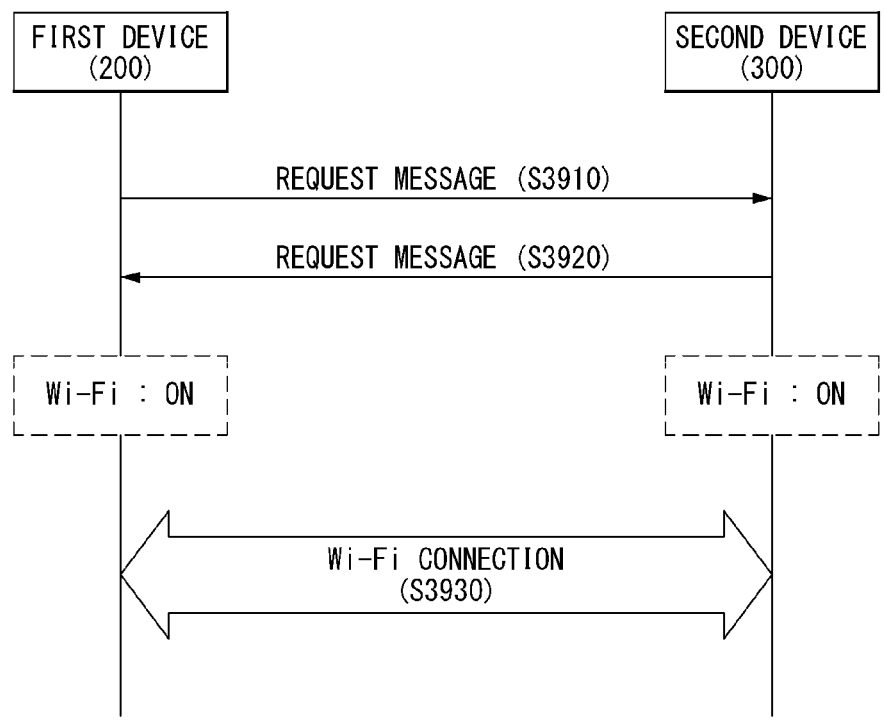

[FIG. 40]
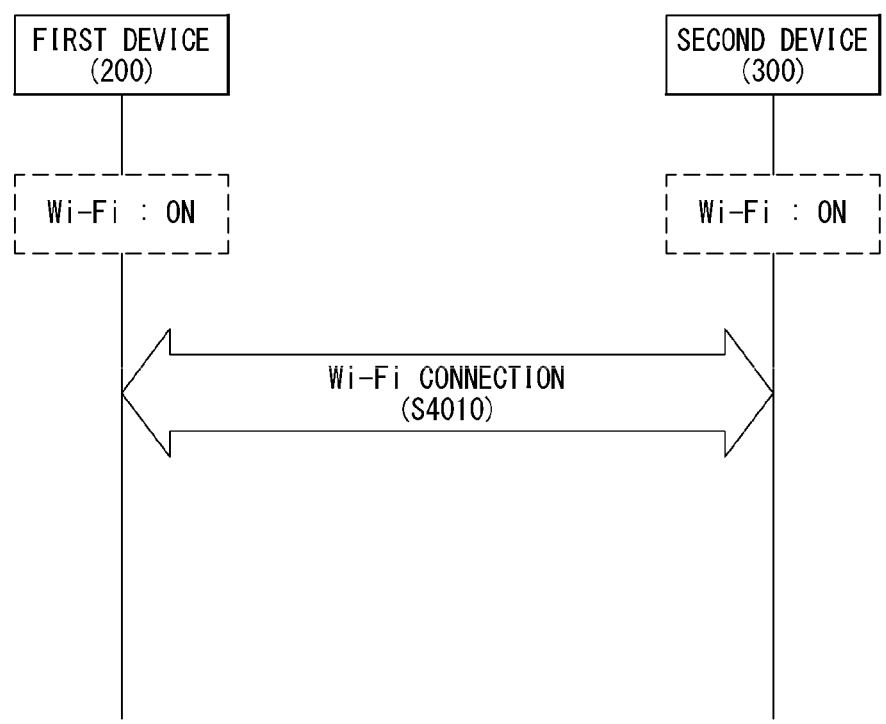

[FIG 41]
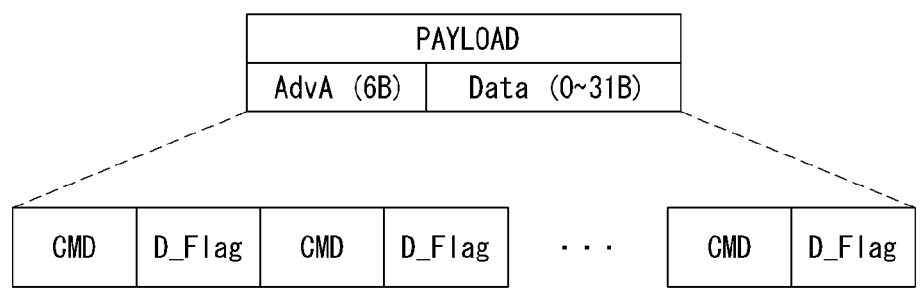
(a)
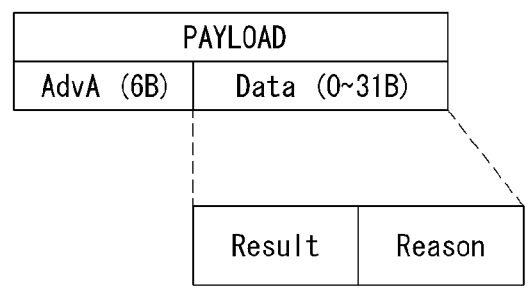
(b)

[FIG. 42]
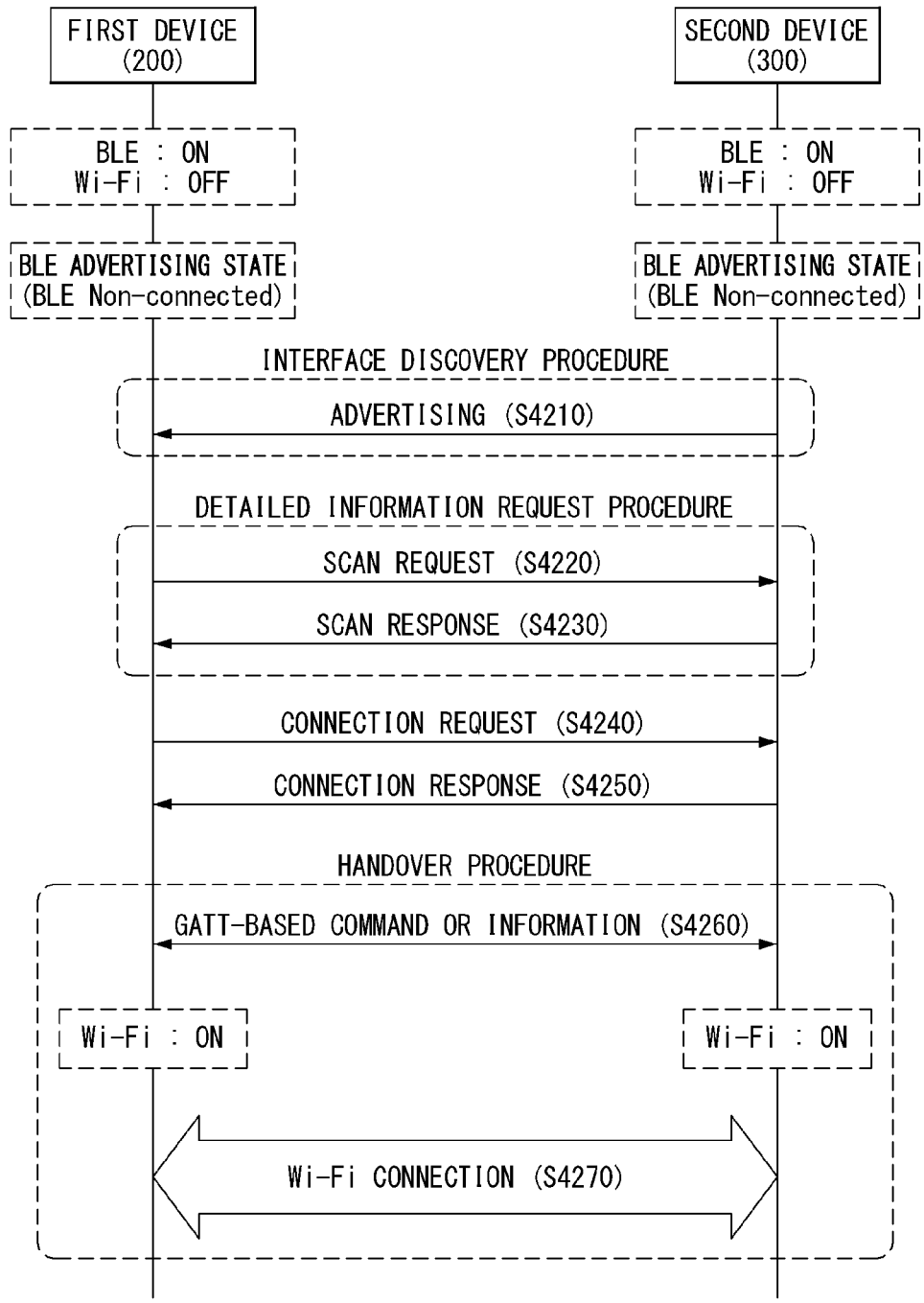

[FIG. 43]
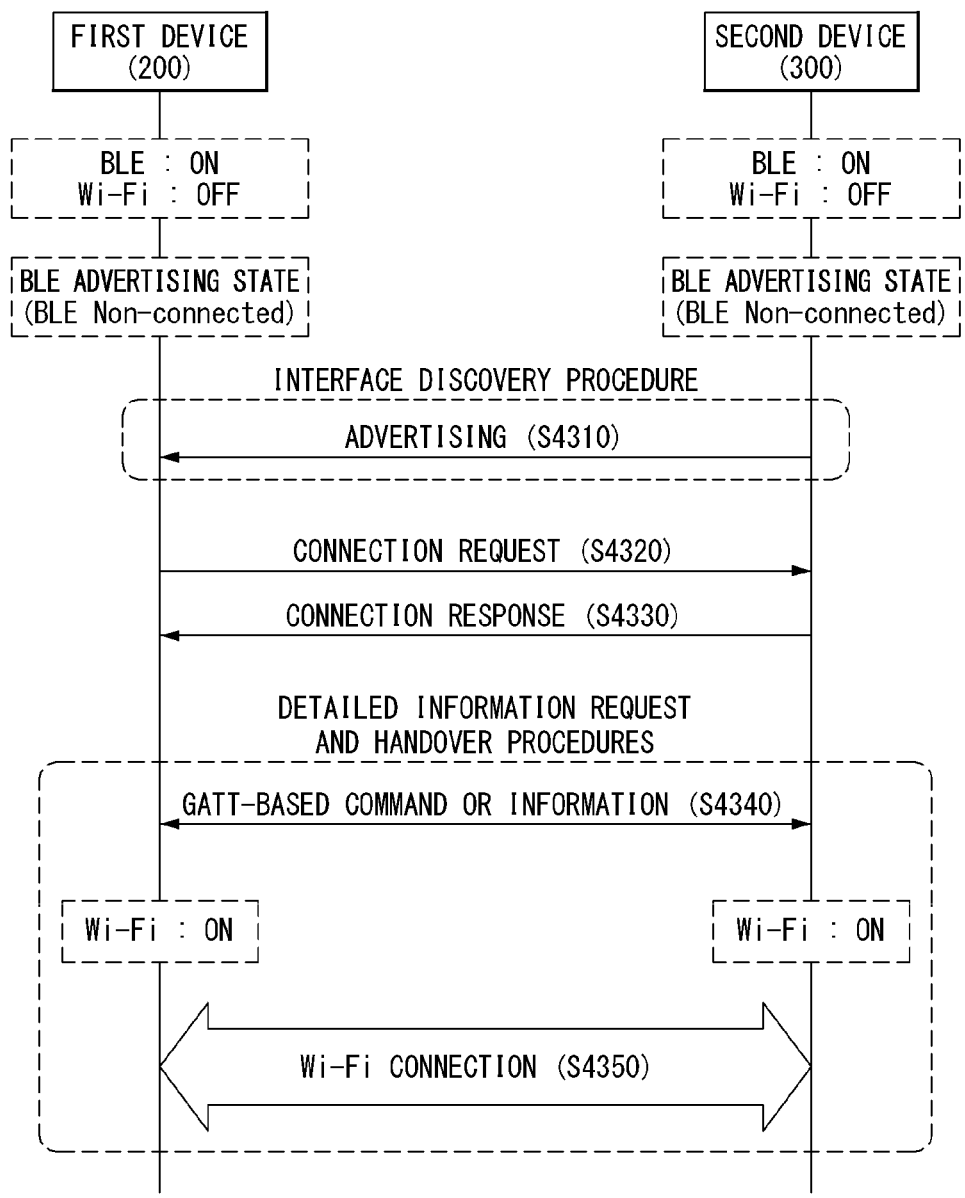

[FIG. 44]
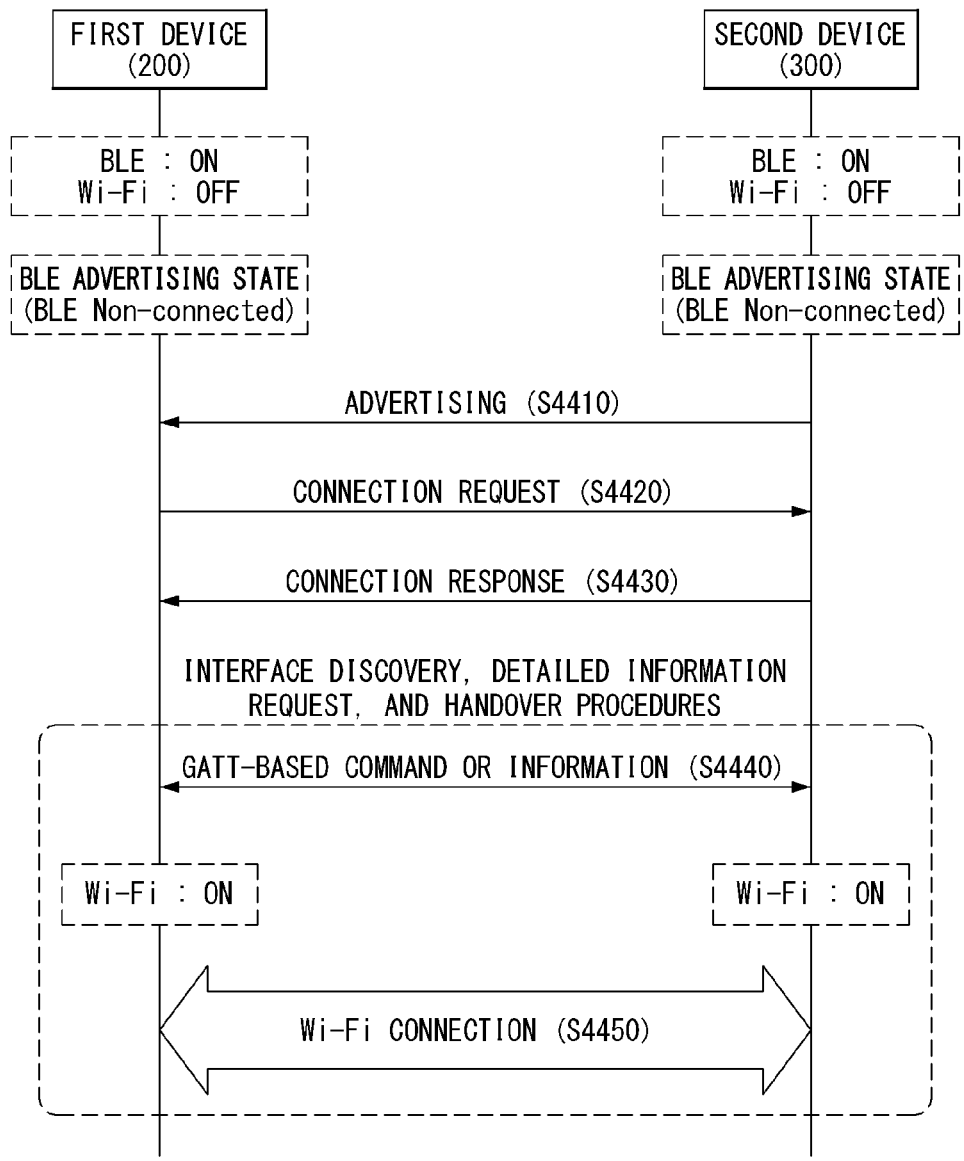

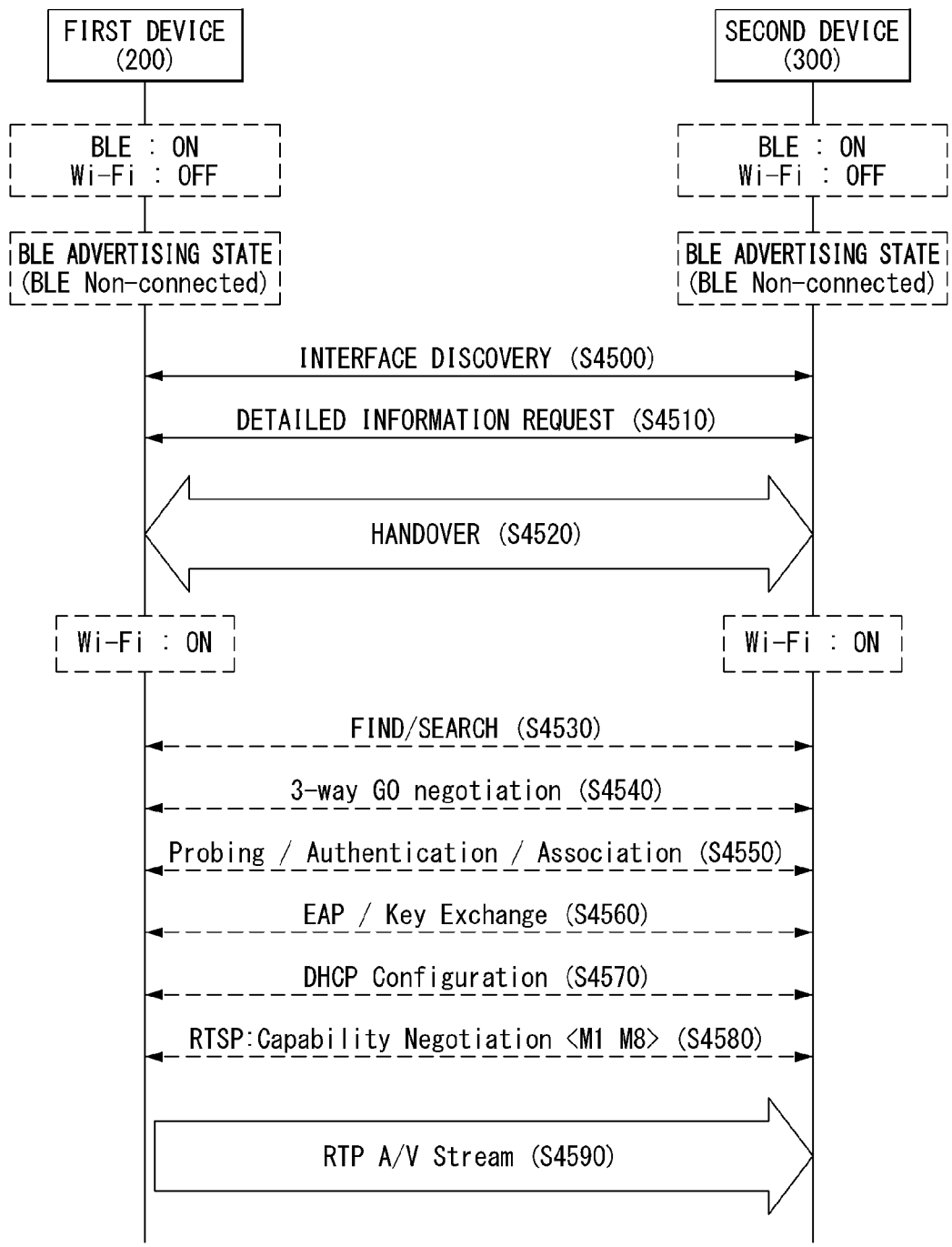
[FIG. 45]

METHOD AND APPARATUS FOR CONTROLLING ELECTRONIC DEVICE IN WIRELESS COMMUNICATION SYSTEM SUPPORTING BLUETOOTH COMMUNICATION

CROSS REFERENCE TO RELATED APPLICATIONS

This application is the National Phase of PCT International Application No. PCT/KR2015/004605, filed on May 8, 2015, which claims priority under 35 U.S.C. 119(e) to U.S. Provisional Application No. 62/031,167, filed on Jul. 31, 2014, U.S. Provisional Application No. 62/067,406, filed on Oct. 22, 2014, U.S. Provisional Application No. 62/069,329, filed on Oct. 28, 2014, U.S. Provisional Application No. 62/080,383, filed on Nov. 16, 2014, and U.S. Provisional Application No. 62/103,025, filed on Jan. 13, 2015. All these applications are hereby expressly incorporated by reference into the present application.

TECHNICAL FIELD

The present invention relates to a method and an apparatus for establishing a connection by transmitting information of a wireless network in a wireless communication system, and particularly, to a method and an apparatus for reducing a handover time and a handover procedure by transmitting information of another network through Bluetooth low energy (LE).

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

An object of the present invention is to provide a method for discovering an alternative communication means and a service of the alternative communication means through Bluetooth communication.

Further, another object of the present invention is to provide a method for forming a connection by discovering the alternative communication means and the service of the alternative communication means through Bluetooth low energy (LE) communication.

In addition, yet another object of the present invention is to provide a method for reducing power consumption by deactivating another alternative communication means in addition to the Bluetooth low energy (LE) communication.

Moreover, still yet another object of the present invention is to provide a method for simplifying a connection procedure of the alternative communication means by acquiring information required for connecting the alternative communication means by using the Bluetooth low energy (LE) communication.

Besides, still yet another object of the present invention is to increase user convenience because multiple wireless communication means may be connected by using one wireless communication means.

In addition, still yet another object of the present invention is to efficiently form a Wi-Fi direct connection by acquiring information for forming the Wi-Fi direct connection through the Bluetooth LE.

Further, still yet another object of the present invention is to simplify a Wi-Fi direct connection procedure by acquiring the information for forming the Wi-Fi direct connection through the Bluetooth LE.

Technical Solution

In order to address the aforementioned problem, the present invention provides a method and an apparatus for establishing a Wi-Fi Direct connection through Bluetooth low energy (LE) technology.

In detail, according to an embodiment of the present invention, provided is a method for establishing a Wi-Fi Direct connection through Bluetooth low energy (LE), including: receiving an advertising message including information associated with Wi-Fi Direct from a second device; transmitting a request message for requesting detailed information of the Wi-Fi Direct to the second device based on the advertising message; receiving a response message including the detailed information in response to the request message; and establishing the Wi-Fi Direct connection with the second device, wherein the advertising message is transmitted through a specific channel for a Bluetooth low energy (LE) connection and the information includes at least one of ID information indicating the Wi-Fi Direct, location information of the detailed information, or available information of an alternative communication means.

Further, in the present invention, the location information indicates one of a scan response message, a GATT data base, or a scan response message and the GATT data base.

In addition, in the present invention, the detailed information includes at least one of channel information for the Wi-Fi Direct connection, MAC address information of the second device, network type information, or channel type information.

Moreover, in the present invention, the request message and the response message are transmitted/received through the specific channel.

In addition, the method further includes: transmitting a Bluetooth low energy (LE) connection request message to the second device; receiving a Bluetooth low energy (LE) connection response message from the second device in response to the Bluetooth low energy (LE) connection request message; and establishing a Bluetooth low energy (LE) connection with the second device, wherein the request message and the response message are transmitted/received through a data channel for transmitting/receiving data of Bluetooth low energy (LE).

Moreover, the method further includes: transmitting a connection request message for the Wi-Fi Direct connection to the second device; and receiving a response message in response to the connection request message.

Further, in the present invention, the connection request message includes a command for the Wi-Fi Direct connection, and the response message includes result information for the command and reason information for a failure when the result information indicates the failure.

In addition the information further includes service information supported by the Wi-Fi Direct and the ID information, the location information, the available information, and the service information are included in a bit format.

Further, provided is an apparatus including: a communication unit for transceiving a signal with the outside by a wired and/or wireless scheme; and a control unit functionally connected with the communication unit, wherein the controller performs a control to receive an advertising message including information associated with Wi-Fi Direct from a second device, transmit a request message for requesting detailed information of the Wi-Fi Direct to the second device based on the advertising message, receive a response message including the detailed information in response to the request message, and establish the Wi-Fi Direct connection with the second device, and the advertising message is transmitted through a specific channel for a Bluetooth low energy (LE) connection and the information includes at least one of ID information indicating the Wi-Fi Direct, location information of the detailed information, and available information of an alternative communication means.

Further, in the present invention, the location information indicates one of a scan response message, a GATT data base, or a scan response message and the GATT data base.

In addition, in the present invention, the detailed information includes at least one of channel information for the Wi-Fi Direct connection, MAC address information of the second device, network type information, or channel type information.

Moreover, in the present invention, the request message and the response message are transmitted/received through the specific channel.

In addition, in the present invention, the control unit performs a control to transmit a Bluetooth low energy (LE) connection request message to the second device, receive a Bluetooth low energy (LE) connection response message from the second device in response to the Bluetooth low energy (LE) connection request message, and establish a Bluetooth low energy (LE) connection with the second device, and the request message and the response message are transmitted/received through a data channel for transmitting/receiving data of Bluetooth low energy (LE).

Further, in the present invention, the control unit transmits a connection request message to the second device, and receives a response message in response to the connection request message.

Moreover, in the present invention, the connection request message includes a command for the Wi-Fi Direct connection, and the response message includes result information for the command and reason information for a failure when the result information indicates the failure.

In addition the information further includes service information supported by the Wi-Fi Direct and the ID information, the location information, the available information, and the service information are included in a bit format.

ADVANTAGEOUS EFFECTS

According to a method for connecting a wireless communication means through Bluetooth low energy (LE) in accordance with an embodiment of the present invention, multiple wireless communication means is connected by using one wireless communication means to increase user convenience.

Further, according to the method for connecting a wireless communication means in accordance with the embodiment of the present invention, multiple wireless communication means is connected through the Bluetooth LE to simplify a connection procedure.

In addition, according to the method for connecting a wireless communication means in accordance with the embodiment of the present invention, multiple wireless communication means is connected through the Bluetooth LE to shorten a connection time of another wireless communication technology.

Moreover, according to the method for connecting a wireless communication means in accordance with the embodiment of the present invention, only the Bluetooth LE is activated and another wireless communication means is deactivated to reduce power consumption.

Further, according to the method for establishing a Wi-Fi direct connection in accordance with the embodiment of the present invention, the Wi-Fi direct connection procedure can be simplified by acquiring the information for establishing the Wi-Fi direct connection through the Bluetooth LE.

Moreover, according to the method for establishing a Wi-Fi direct connection in accordance with the embodiment of the present invention, only the Bluetooth LE is activated and Wi-Fi direct is deactivated to reduce power consumption.

DESCRIPTION OF DRAWINGS

FIG. 1 is a schematic view illustrating an example of a wireless communication system using a Bluetooth low energy technology proposed in this specification.

FIG. 2 illustrates an example of a connection method of a device-to-device wireless communication interface.

FIG. 3 is a view illustrating an example of a Bluetooth low energy topology.

FIG. 4 is a view illustrating an example of a Bluetooth communication architecture proposed in this specification.

FIG. 5 illustrates one example of an internal block diagram of a device which may implement methods proposed by this specification.

FIG. 6 illustrates one example of a wireless communication interface structure proposed by this specification.

FIG. 7 is a flowchart illustrating one example of a method for providing information of a wireless communication interface proposed by this specification.

FIG. 8 is a diagram illustrating one example of a data format of the detailed information described in FIG. 7.

FIGS. 9 and 10 are flowcharts illustrating another example of the method for providing the information of the wireless communication interface proposed by this specification.

FIG. 11 is a flowchart illustrating yet another example of the method for providing the information of the wireless communication interface proposed by this specification.

FIGS. 12 and 13 are diagrams illustrating generic attribute profile (GATT) structure of Bluetooth as one example of a tree structure illustrated in FIG. 11.

FIGS. 14 and 15 are diagrams illustrating one example of wireless communication interface information of the GATT structure proposed by this specification.

FIGS. 16 and 17 are flowcharts illustrating the method for providing the information of the wireless communication interface through a Bluetooth LE connection process and one example for a data format, which are proposed by this specification.

FIG. 18 is a flowchart illustrating still yet another example of the method for providing the information of the wireless communication interface through the Bluetooth LE connection process, which is proposed by this specification.

FIG. 19 is a flowchart illustrating one example of a method for providing information of a wireless communication interface through Bluetooth LE, which is proposed by this specification.

FIG. 20 is a flowchart illustrating another example of the method for providing the information of the wireless communication interface through the Bluetooth LE, which is proposed by this specification.

FIG. 21 is a flowchart illustrating one example of a method for providing information of a wireless communication interface through a Bluetooth LE connection procedure and Bluetooth LE, which is proposed by this specification.

FIG. 22 is a flowchart illustrating another example of the method for providing the information of the wireless communication interface through the Bluetooth LE connection procedure and the Bluetooth LE, which is proposed by this specification.

FIG. 23 is a flowchart illustrating yet another example of the method for providing the information of the wireless communication interface through the Bluetooth LE connection process, which is proposed by this specification.

FIGS. 24 and 25 are diagrams illustrating another example of the data format, which is proposed by this specification.

FIG. 26 is a flowchart illustrating yet another example of the method for providing the information of the wireless communication interface through the Bluetooth LE, which is proposed by this specification.

FIG. 27 is a diagram illustrating one example of a user interface (UI), which is proposed by this specification.

FIG. 28 is a diagram illustrating one example of a method for sharing a channel map between wireless communication interfaces, which is proposed by this specification.

FIG. 29 is a flowchart illustrating one example of a method for sharing a channel map between wireless communication interfaces, which is proposed by this specification.

FIG. 30 illustrates one example of a method for announcing a serviceable range between wireless communication interfaces, which is proposed by this specification.

FIG. 31 is a flowchart illustrating one example of exchanging frequency hopping synchronization (FHS) information of a Bluetooth BR/EDR through Bluetooth LE, which is proposed by this specification.

FIG. 32 is a diagram illustrating power consumption between Bluetooth LE and Wi-Fi.

FIG. 33 is a diagram illustrating a connection process of Wi-Fi Direct.

FIG. 34 is a diagram schematically illustrating an example of a method for connecting the Wi-Fi Direct by using the Bluetooth LE, which is proposed by this specification.

FIG. 35 is a diagram schematically illustrating an example of a method using the Bluetooth LE during the Wi-Fi Direct connection process, which is proposed by this specification.

FIG. 36 is a flowchart illustrating an example of a method for connecting the Wi-Fi Direct by using a connection procedure of the Bluetooth LE, which is proposed by this specification.

FIG. 37 is a diagram illustrating an example of a data format for an advertising message, which is proposed by this specification.

FIG. 38 is a diagram illustrating an example of a data format of a response message to a detailed information request of an interface, which is proposed by this specification.

FIGS. 39 to 41 are diagram specifically illustrating a handover procedure and the data format of FIG. 36, which is proposed by this specification.

FIG. 42 is a diagram schematically illustrating an example of a method for connecting the Wi-Fi Direct by using the Bluetooth LE, which is proposed by this specification.

FIG. 43 is a diagram schematically illustrating another example of the method for connecting the Wi-Fi Direct by using the Bluetooth LE, which is proposed by this specification.

FIG. 44 is a flowchart illustrating an example of the method for connecting the Wi-Fi Direct through connected Bluetooth LE, which is proposed by this specification.

FIG. 45 is a diagram schematically illustrating yet another example of the method for connecting the Wi-Fi Direct by using the Bluetooth LE, which is proposed by this specification.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself Electronic devices in this document may include a cellular phone, smartphone, laptop computer, digital broadcasting terminal, personal digital assistants (PDA), portable multimedia player (PMP), navigation terminal, and temperature/barometer/biometric data sensor; however, it should be clearly understood by those skilled in the art that except for those specific cases applicable only to a mobile terminal, the structure according to the embodiments of the present invention can also be applied to fixed terminals such as a digital TV and a desktop computer.

A signal described in this document can be transmitted in the form of not only a message but also a frame. A wireless communication interface and a wireless communication means are assigned or used interchangeably by taking into account only the convenience of writing the specification of the present invention and do not have individual implications or provide individual roles that can be distinguished from each other.

FIG. 1 is a schematic view illustrating an example of a wireless communication system using a Bluetooth low energy technology proposed in this specification.

A wireless communication system 100 includes at least one server device 110 and at least one client device 120.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 110 may operate as a client device in a relationship with other device, and the client device may operate as a server device in a relationship with other device. That is, in the BLE communication system, any one device may operate as a server device or a client device, or may operate as both a server device and a client device if necessary.

The server device 110 can be denoted as a data service device, master device, master, server, conductor, host device, audio source device, gateway, or first device; and the client device can be denoted as a slave device, slave, client, member, sensor device, sink device, audio sink device, or second device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 5.

Also, the wireless communication system may configure personal area networking (PAN) through the Bluetooth technology. For example, in the wireless communication system, a private piconet may be established between devices to quickly and safely exchange files, documents, and the like.

A BLE device (or apparatus) can operate to support various Bluetooth-related protocols, profiles, and processes.

An electronic device supporting the BLE also supports various wireless communication interfaces such as Wi-Fi, Bluetooth BR/EDR, and NFC.

Since it is difficult for various wireless communication interfaces to predict when a connection to a corresponding device is established, most electronic devices maintain a plurality of wireless communication interfaces to be at a wake-up state.

These communication interfaces have a technical solution for minimizing standby power within idle time and also exhibit excellent energy efficiency due to the technical solution. However, it is highly restrictive to maintain all of wireless communication interfaces that can be newly devised with technological development to be at a wake-up state all the time, which can be more serious for battery-limited devices.

To overcome this situation, the present invention proposed a method which uses BLE as a wake-up interface and wakes up other wireless communication interfaces only upon a request being made.

FIG. 2 illustrates an example of a connection method of a device-to-device wireless communication interface.

Referring to FIG. 2, wireless communication interfaces included in the device perform a connection according to respective procedures.

In detail, in the case of a first device 200 and a second device 300 possessing multiple wireless communication interfaces, the respective wireless communication interfaces of the electronic apparatus performs roles thereof in respective different methods and forms for the same or similar purpose as illustrated in FIG. 2.

However, in most cases, there is a high probability that only one wireless communication interface will be used at any one time and when multiple wireless communication interfaces maintain a reception stand-by state for information exchange with target apparatuses in this regard, respectively, the resulting energy consumption may be unnecessarily generated.

In FIG. 2, when the first device 200 and the second device 300 intend to perform wireless communication through the Bluetooth BR/EDR, the first device 200 searches the Bluetooth BR/EDR of the second device 300, verifies a capability, and connects the second device 300 through the Bluetooth BR/EDR to perform the wireless communication.

Similarly thereto, when the first device 200 and the second device 300 intend to perform the wireless communication through near field communication (NFC), the first device 200 searches the Bluetooth BR/EDR of the second device 300, verifies the capability, and connects the second device 300 through the NFC.

As described above, it is inefficient that the multiple wireless communication interfaces continuously stands by for information exchange with the target apparatus, of which occurrence time may not be known in a single which may not occur in a single device in terms of energy efficiency.

Further, since a procedure performed for search and connection is diversified for each wireless communication interface, user convenience deteriorates.

The present invention proposes a method for unifying an interface for communication stand-by with the target apparatus to BLE and activating other wireless communication interfaces through the BLE only when needed in order to address such a problem.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time FIG. 4 is a view illustrating an example of a Bluetooth communication architecture proposed in this specification.

With reference to FIG. 4, FIG. 4(a) illustrates one example of protocol stack of Bluetooth BR (Basic Rate)/EDR (Enhanced Data Rate), and FIG. 4(b) illustrates one example of a protocol stack of Bluetooth LE (Low Energy).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

- The link manager layer 16 may perform ACL/SCO logical transport, logical link setup, and control
- Detach: The link manager layer 16 stops connection and informs a counterpart device about the reason for stopping connection.
- The link manager layer 16 performs power control and role switch.
- The link manager layer 16 performs security (authentication, pairing, encryption) function.

The host controller interface layer 18 provides the interface between the Host module and the Controller module to allow the host to provide the command and the data to the controller and the controller to provide the event and the data to the host.

The host stack (alternatively, host module 20) includes a logic link control and adaptation protocol (L2CAP) 21, a BR/EDR protocol 22, a generic access profile (GAP) 23, and a BR/EDR profile 24.

The logic link control and adaptation protocol (L2CAP) 21 may provide one bidirectional channel for transmitting the data to a specific protocol or profile.

The L2CAP 21 may multiplex various protocols, profiles, and the like provided in a higher Bluetooth layer.

The L2CAP of the Bluetooth BR/EDR uses a dynamic channel, supports a protocol service multiplexer, retransmission, and a streaming mode, and provides segmentation, reassembly, per-channel flow control, and error control.

The BR/EDR protocol 22 and the profiles 24 define a service (profile) using the Bluetooth BR/EDR and define an application protocol for transmitting and receiving the data and the generic access profile (GAP) 23 defines a scheme that discovers the device, connects the device, and provides information to the user and provides privacy.

As illustrated in FIG. 4(b), the Bluetooth LE protocol stack includes a controller stack 30 which is operable to process a wireless device interface of which a timing is important and a host stack 40 which is operable to process high-level data.

First, the controller stack 30 may be implemented by using a communication module which may include a Bluetooth wireless apparatus, for example, a processor module which may include a processing device such as a microprocessor.

The host stack may be implemented as a part of an OS which operates on the processor module or instantiation of a package above the OS.

In some cases, the controller stack and the host stack may be actuated or executed on the same processing device in the processor module.

The controller stack 30 includes a physical layer (PHY) 32, a link layer 34, and a host controller interface 36.

The physical layer (PHY) (wireless transceiving module) 32 as a layer that transceives a 2.4 GHz wireless signal uses Gaussian frequency shift keying (GFSK) modulation and a frequency hopping technique constituted by 40 RF channels.

The link layer 34 that serves to transmit or receive a Bluetooth packet performs advertising and scanning functions by using three advertising channels and thereafter, provides functions to generate a device-to-device connection and transmit and receive a data packet of a maximum of 42 bytes through 37 data channels.

In the present invention, information for a connection procedure of another wireless communication interfaces in addition to the BLUE may be exchanged between the devices by using the advertising or scanning function and the connection procedure of the another communication interface may be performed based on the exchanged information.

The host stack may include a generic access profile (GAP) 40, a logic link control and adaptation protocol (L2CAP) 41, a security manager (SM) 42, an attribute protocol (ATT) 440, a generic attribute profile (GATT) 44, a generic access profile 25, and an LT profile 46. However, the host stack 40 is not limited thereto and the host stack 40 may include various protocols and profiles.

The host stack may multiplex various protocols, profiles, and the like provided in the higher Bluetooth layer by using the L2CAP.

First, the logic link control and adaptation protocol (L2CAP) 41 may provide one bidirectional channel for transmitting the data to a specific protocol or profile.

The L2CAP 41 is operable to multiplex the data among higher layer protocols, segment and reassemble packages, and manage multicast data transmission.

In the Bluetooth LE, three fixed channels (one for a signaling CH, one for the security manager, and one for the attribute protocol) are used.

On the contrary, in basic rate/enhanced data rate (BR/EDR), the dynamic channel is used and the protocol service multiplexer, the retransmission, the streaming mode, and the like are supported.

The security manager (SM) 42 is a protocol for authenticating the device and providing key distribution.

The attribute protocol (ATT) 43 defines a rule for accessing data of a counter device in a server-client structure. The ATT includes six following message types (request, response, command, notification, indication, and confirmation).

1̂ Request and Response message: a request message refers to the message used by a client device to request specific information from a server device, and a response message refers to the message transmitted by the server device to the client device in response to the request message.

2̂ Command message: a message transmitted from a client device to a server device to command a specific operation. The server device does not transmit a response to the command message to the client device.

3̂ Notification message: It is a message transmitted from the server device to the client device in order to notify an event, or the like. The client device does not transmit a confirmation message with respect to the notification message to the server device.

4̂ Indication and confirmation message: It is a message transmitted from the server device to the client device in order to notify an event, or the like. Unlike the notification message, the client device transmits a confirmation message regarding the indication message to the server device.

The generic access profile (GAP) 45 as a layer newly implemented for the Bluetooth LE technology is used for selecting a role for communication among Bluetooth LE devices and control how multi profiles are actuated.

Further, the generic access profile (GAP) 45 is primarily used in device discovery, connection creation, and security procedure parts and defines a scheme for providing the information to the user and defines the type of the attribute.

1̂ Service: It defines a basic operation of a device by a combination of behaviors related to data 2̂ Include: It defines a relationship between services 3̂ Characteristics: It is a data value used in a server 4̂ Behavior: It is a format that may be read by a computer defined by a UUID (value type).

The LE profile 46 has a dependency on the GATT and is used mainly for Bluetooth LE devices. For example, the LE profile 46 includes Battery, Time, FindMe, Proximity, Time, Object Delivery Service, and the like; specific contents of the GATT-based profiles are as follows.

Battery: Battery information exchanging method

Time: Time information exchanging method

FindMe: Provision of alarm service according to distance

Proximity: Battery information exchanging method

Time: Time information exchanging method

The generic attribute profile (GATT) 44 is operable as a protocol for describing how the attribute protocol 43 is used at the time of configuring the services. For example, the generic attribute profile (GATT) 44 is operable to regulate how ATT attributes are together grouped by the services and operable to describe features associated with the services.

Therefore, the generic attribute profile 44 and the attribute protocol (ATT) 43 may use the features in order to describe the status of the device and the services and describe how the features are associated with each other and how the features are used.

Hereinafter, the procedures of the Bluetooth low energy (BLE) technology will be described in brief The BLE procedures may be divided into a device filtering procedure, an advertising procedure, s scanning procedure, a discovering procedure, a connecting procedure, and the like.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

At this time, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional user data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 illustrates one example of an internal block diagram of a device which may implement methods proposed by this specification.

As illustrated in FIG. 5, the first device 200 and the second device 300 may include network interfaces 210 and 310, output units 220 and 320, input units 230 and 330, control units 240 and 340, multimedia modules 250 and 350, first storage units 260 and 360, and/or second storage units 270 and 370.

The internal block diagram of the device illustrated in FIG. 5 may further include other components (a module, a block, and a unit) and some of the components of FIG. 5 may be omitted.

The network interfaces 210 and 310, the output units 220 and 320, the input units 230 and 330, the control units 240 and 340, the multimedia modules 250 and 350, the first storage units 260 and 360, and/or the second storage units 270 and 370 are functionally connected in order to perform the method proposed by this specification.

The network interfaces 210 and 310 represent units (alternatively, modules) in which the data may be transmitted among the devices by using various network technologies (alternatively, means).

The network interfaces 210 and 310 may include energy efficiency interfaces 212 and 312 and/or external interfaces 214 and 314 again.

The energy efficiency interfaces 212 and 312 as units (alternatively, modules) using a network technology for low-power wireless communication may search another device to be connected or transmit data (for example, Bluetooth Low Energy (BLE)).

The external interfaces 214 and 314 represent interfaces (alternatively, wireless communication means) for wireless communication except for the energy efficiency interfaces 212 and 312.

In the present invention, the first device 200 and the second device 300 may transmit/receive information for connecting the external interfaces 214 and 314 through the energy efficiency interfaces 212 and 312 and thus perform connection procedures of the external interfaces 214 and 314.

The output units 220 and 320 represent modules for providing status information of the device and message exchange information to the user through a screen.

The input units 230 and 330 represent modules that allow the user to control the operation of the device by providing an input of the user to the control units 240 and 340, such as a screen button.

The multimedia modules 250 and 350 represent modules for reproducing various types of multimedia and the multimedia modules may be implemented in the control units 240 and 340 and implemented separately from the control units 240 and 340.

The first storage units 260 and 360 represent non-volatile physical devices which may store various types of data.

The second storage units 270 and 370 represent volatile physical devices which temporarily store various types of data.

Although not illustrated, the first device 200 and the second device 300 may include power supply units and the power supply units are applied with external power and/or internal power to supply power required for operating the respective components under the control by the control units.

As described above, in the BLE technology, a small duty cycle may be achieved and the power consumption may be significantly reduced through low-speed data transmission rate and the power supply units may supply the power required for operating the respective components even with low output power (10 mW (10 dBm) or lower).

FIG. 6 illustrates one example of a wireless communication interface structure proposed by this specification.

Referring to FIG. 6, the first device 200 and the second device 300 in the present invention may operate while configuring all wireless communication interfaces other than the BLE module in a sleep state.

In detail, the first device 200 and the second device 300 include various wireless communication interfaces (alternatively, means) including BLE, Wi-Fi Direct, WiGig, Bluetooth BR/EDR, Wi-Fi, and the like.

The first device 200 and the second device 300 may configure the remaining wireless communication interfaces other than the BLE among the various wireless interfaces in the sleep state.

In this case, when the first device 200 or the second device 300 intends to use the wireless communication interfaces including the Wi-Fi Direct, the WiGig, the Bluetooth BR/EDR, and the like, the first device 200 or the second device 300 may connect the wireless communication interface by exchanging capability information of the wireless communication interface to be used through the BLE.

For example, when the first device 200 intends to perform a service such as Miracast or Print by using the Wi-Fi Direct, the first device 200 may negotiate whether the second device 300 may use the Wi-Fi Direct through the BLE and thereafter, exchange information (for example, a listen channel, a BSSID, and an IEEE MAC addr) required for connecting the Wi-Fi Direct.

Thereafter, the first device 200 and the second device 300 may connect the Wi-Fi Direct based on the exchanged information.

Further, the capability information for the wireless communication interface of the counter device may be searched, a control such as Enable, Disable or Connection for the wireless communication interface may be performed, and actual data may be transmitted/received through the connected wireless communication interface after connecting the Wi-Fi Direct.

Through such a method, when the wireless communication interface is not used, the wireless communication interfaces other than the BLE may be configured in the sleep state, and as a result, power consumption may be reduced as compared with a case in which all wireless communication interfaces are in a wake-up state.

Further, since connection information of the wireless communication interface may be acquired through the BLE, the connection procedure and time of the wireless communication interface may be reduced.

FIG. 7 is a flowchart illustrating one example of a method for providing information of a wireless communication interface proposed by this specification.

Referring to FIG. 7, the method is a protocol type method in which the first device 200 may receive the information associated with the wireless communication interface included in the second device 300 from the second device 300 and as necessary, the first device 2 requests detailed information to the second device 300 to receive the information.

In detail, the second device 300 may transmit the information associated with the wireless communication interface included in the second device through the BLE technology and the first device 200 may acquire information on the wireless communication interface which may be supported by the second device 300 based on the information transmitted from the second device 300.

The information on the wireless communication interface which the second device 300 transmits to the first device 200 may be transmitted in a bit mask format.

In the case of the bit mask format, which wireless communication interface the second electronic device 300 supports and which service the second electronic device 300 may support are shown in a bit format.

Table 2 given below shows an example of the bit mask format and Table 3 shows an example of a wireless interface type indicated by each bit.

TABLE 2

| 7<sup>th</sup> bit | 6<sup>th</sup> bit | 5<sup>th</sup> bit | 4<sup>th</sup> bit | 3<sup>rd</sup> bit | 2<sup>nd</sup> bit | 1<sup>st</sup> bit |
| --- | --- | --- | --- | --- | --- | --- |
| 0 | 1 | 0 | 1 | 1 | 1 | 0 |

TABLE 3

| Bit | Network Interface |
| --- | --- |
| 1<sup>st</sup> bit | Wi-Fi |
| 2<sup>nd</sup> bit | Wi-Fi Direct |
| 3<sup>rd</sup> bit | WFDS Print |
| 4<sup>th</sup> bit | WFDS Display |
| 5<sup>th</sup> bit | Wi-Fi Display |
| 6<sup>th</sup> bit | NFC |
| 7<sup>th</sup> bit | Classic Bluetooth |
| 8<sup>th</sup> bit | WiGig |
| 9<sup>th</sup> bit | Zigbee |
| 10<sup>th</sup> bit | Future Interface |

The second device 300 may announce the wireless interface or service which may be supported thereby to the first device 200 through each bit value of the bit mask of Table 2.

That is, since values of the $2^{nd}$, $3^{rd}$, $4^{th}$, and $6^{th}$ bits are 1 in Table 1, the second device 300 may announce that the Wi-Fi Direct, the WFDS Print, the WFDS Display, and the NFC may be supported to the first device 200.

The first device that receives the information on the wireless interface may request detailed information (alternatively, additional information) on the wireless communication interface to the second device 300 when the detailed information (alternatively, additional information) on the wireless interface is required (S720).

The second device 300 that receives the request for the detailed information from the first device may transmit the requested detailed information (alternatively, additional information) on the wireless communication interface to the first device (S730).

The detailed information may include the information on the wireless interface or detailed information (alternatively, additional information) on the service provided by the wireless interface.

FIG. 8 is a diagram illustrating one example of a data format of the detailed information described in FIG. 7.

Referring to FIG. 8, the detailed information is constituted by an information type field indicting the type of the information and a detailed information field including the detailed information of the information. For example, when the first device 200 requests detailed information of Classic Bluetooth to the second device 300, the second device 300 may transmit the detailed information of the Classic Bluetooth to the first device 200 by using the data format of FIG. 8.

In detail, when the second device 300 intends to transmit detailed information regarding an address and a device type for connecting the Classic Bluetooth to the first device 200, the information type may include a value indicating information regarding the address or the device type and the detailed information may include an address value or a value indicating the device type.

Table 4 given below shows an example of parameters constituting the detailed information.

TABLE 4

| Parameter | Description |
| --- | --- |
| Device Address value | Unique ID value for distinguishing device |
| Device Address type | Distinguishes what type of wireless interface address corresponds to |
| Device Address length | Length of device address value |
| Device Class | Indicates to which device category device belongs (e.g., Print, Head set, etc.,) |
| Security Information | Information transmitted and received for security during pairing |
| Synch Code | Value transmitted and received for synchronization of two devices |
| Scan Window Interval | Indicates a period in which device performs listening to receive signals transmitted by other devices |
| Link Address | ID value for distinguishing link when wireless connection is performed between two devices |
| Clock | Native clock of device |
| Scan Mode | Indicates pattern in which device performs listening to receive signals transmitted by other devices |
| Connection Start | Command indicating device-to-device connection using specific wireless interface |
| Number of connections | Number of devices connected to specific wireless interface |
| Device Status | Device status such as on/off status of specific wireless interface, etc. |
| Carrier Bitmask | Value indicating type of wireless interface possessed by device |
| Listen Channel | Channel in which P2P exchange data with each other in search step |

TABLE 4-continued

| Parameter | Description |
| --- | --- |
| Channel Class | Frequency band (2.4 GHz/5 GHz/60 GHz) used in Wi-Fi, etc. |
| SSID | Connection identifier between wireless apparatus and AP |
| P2P Capability | Indicates whether connection to P2P group is available |
| Configuration Method | Subordinate connection method to external interface (e.g., WSCIE (Wi-Fi)) |
| Supported Rate | Tx Rate |
| Peer addr | External Interface Address of peer device |
| Channel Information | Overall information regarding channel, such as Supported Channel List or Channel Map |
| Operating Channel | Channel in which two devices are connected to exchange data |
| Connection Status | Information indicating whether device is connected with other device and device with which device is connected |
| Active Period | Time value when interface is in active state when interface operates alternately in active state and in sleep state |
| Sleep Period | Time value when interface is in sleep state when interface operates alternately in active state and in sleep state |
| Packet Transmission Interval | Time value between two packets when interface is configured to periodically transmit packets |
| Service UUID (Universal Unique Identifier) | UUIDs for services provided by device and each interface |

When the information is transmitted in the bit mask format, an effect of increasing the energy efficiency by the length of all packets may be achieved.

FIGS. 9 and 10 are flowcharts illustrating another example of the method for providing the information of the wireless communication interface proposed by this specification.

FIGS. 9 and 10 illustrate a format of a data stream to exchange the information on the wireless communication interface which may be supported by each device by the protocol type method.

In detail, the first device 200 or the second device 300 may exchange the information on the wireless communication interface which is supported by each device through the data stream. As illustrated in FIGS. 9 and 10, the first device 200 or the second device 300 is divided into a header part and a payload part.

As illustrated in FIG. 9, the header part includes summary information of the wireless communication interface and the payload part includes the detailed information on each wireless communication interface.

The summary information includes information on the number of wireless communication interfaces which may be supported by each device and/or an office value at which the detailed information on each wireless communication interface is positioned.

Unlike FIG. 9, in FIG. 10, the header part includes the summary information of the wireless communication interface and the information on the number of wireless communication interfaces which may be supported by the device.

The summary information of the interface is constituted by information offsets for each wireless communication interface and each information offset is constituted by an interface indicator field and a detailed information position offset field.

The interface indicator field includes information associated with the type of the wireless communication interface included in each device and the detailed information offset field includes information indicating in which position of the payload the detailed information on a specific wireless interface is included.

The payload part is constituted by detailed information fields of the wireless communication interface and each wireless communication interface detailed information field is constituted by an information type field indicating the type of the information and a field including detailed information corresponding to the type of the information.

The detailed information field may include the parameters shown in Table 3.

The respective devices may exchange the information on the wireless communication interfaces included in the respective devices through the data streams illustrated in FIGS. 9 and 10 and perform the wireless communication interface based on the exchanged information.

FIG. 11 is a flowchart illustrating yet another example of the method for providing the information of the wireless communication interface proposed by this specification.

Referring to FIG. 11, two devices possess a predetermined common data tree and exchange a tree number for the common data tree to exchange the information on the wireless communication interface.

In detail, the first device 200 and the second device 300 classify all data associated with the wireless communication interface for each item, and manages the classified data in a tree structure and unique IDs are granted to all items.

The structure of the wireless communication interface classified as described above is known to the first device 200 and the second device 300.

As illustrated in FIG. 11, the tree structure is configured in a hierarchical structure and respective entities which exist in respective layers possess unique IDs thereof and the first device 200 or the second device 300 may request and receive the information on the wireless communication interface of the device to be connected through the respective unique IDs.

For example, when the first device 200 requests information on a Wi-Fi SSID to the second device 300, the first device 200 requests and reads information included in "01.02.02.01" to the second device 300 to acquire the information on the "Wi-Fi SSID".

The user acquires the capability value for the wireless interface to determine the status of the wireless communication interface or change the value in the structure illustrated in FIG. 11.

FIGS. 12 and 13 are diagrams illustrating generic attribute profile (GATT) structure of Bluetooth as one example of a tree structure illustrated in FIG. 11.

The Bluetooth GATT defines a method in which two BLE devices transmit and receive data by using services and characteristics.

Through the GATT, a command to transmit data regarding the characteristics is provided from a server device to a client device and from the client device to the server device is provided. In this case, the value may be read by designating the UUID of the characteristics or a handle value provided in an information search command.

Further, the GATT may provide an announcement and a display. The client device may request the announcement of a specific characteristic to the server device and the server device may transmit the corresponding value to the client device whenever the server device is usable.

When such a structure of the GATT is described through FIG. 12, one profile is constituted by multiple services and each service is constituted by multiple characteristics.

One characteristic includes one value and n descriptors and each descriptor describes the value of the characteristic.

In the present invention, the information on the wireless communication interface may be stored in the device in the GATT structure and the information on the GATT structure, which is stored may be read and received from the counter device.

FIGS. 14 and 15 are diagrams illustrating one example of wireless communication interface information of the GATT structure proposed by this specification.

Referring to FIGS. 14 and 15, two types of the GATT for the information on the wireless communication interface included in each device may be described.

First, as illustrated in FIG. 14, the information on the wireless communication interface included in the device may be subordinate to a wireless communication interface service in a specific profile.

Second, as illustrated in FIG. 15, a separate wireless communication interface profile may be operated independently from another profile. In this case, the respective wireless communication interface services are defined in the wireless communication interface profile and in the respective wireless communication interface services, the information on the wireless communication interface are defined as the characteristics.

In the present invention, the information on the wireless communication interface of another device may be read through the wireless communication interface information in the GATT structure illustrated in FIGS. 14 and 15 and the connection procedure of the wireless communication interface may be performed based on the read wireless communication interface information.

FIGS. 16 and 17 are flowcharts illustrating the method for providing the information of the wireless communication interface through a Bluetooth LE connection process and one example for a data format, which are proposed by this specification.

Referring to FIGS. 16 and 17, two devices may request and provide information of a wireless communication interface other than BLE through an advertising process for BLE paring.

In detail, the first device 200 exists in a scanning state before BLE pairing and the second device 300 exists in an advertising state.

The second device 300 in the advertising state may transmit an advertising message to the first device 200 through an advertising channel in order to perform the BLE connection procedure (S1610).

The advertisement message is used to notify the second device 300 to neighboring devices having the BLE function, and information of a possible wireless communication interface may be included.

The information of the wireless communication interface included in the advertising message may include a Bit_Mask type described in FIG. 7 or the interface summary information of the data stream described in FIGS. 9 and 10.

FIG. 17A illustrates an example of a packet data unit of the advertising message and the information of the wireless communication interface of the second device 300 may be included in a Bit_Mask type.

The AdvA field includes a value indicating which type of PDU the PDU of the advertising message is and in the exemplary embodiment, the PDU of the advertisement message may be the following type of PDU.

ADV_IND
ADV_NONCONN_IND
ADV_SCAN_IND
EXTENDED_ADV_IND
LONG_ADV_NONCONN_IND

The EXTENDED_ADV_IND and the LONG_ADV_NONCONN_IND are the ADV_IND and ADV_NONCONN_IND types of which the data length is extended.

The AdvData field includes the information of the wireless communication interface and includes a Type field indicating an information type and a Bitmask field including an information value corresponding to the Type.

The Type field may include one of Supported Tech, Status, or Availability information. The Supported Tech field may include information on a supportable wireless communication interface, the Status field may include operational status information on the supportable wireless communication interface, and the Availability field may include information regarding whether the supportable wireless communication interface is usable.

The first device 200, which verifies what the wireless communication interface supportable by the second device 300 is, through the advertisement message, requests the information on the wireless communication interface to the second device through a scan request when detailed information is required in the verified wireless communication interface or the information of the wireless communication interface (S1620).

The scan request PDU may have a SCAN_REQ type among the types shown in Table 1, or may have a LONG_SCAN_REQ type, which is an extension type of the SCAN_REQ.

The second device 300 may transmit the detailed information of the requested wireless communication interface to the first device 200 through a scan response (S1630).

FIG. 17B illustrates an example of a packet data unit (PDU) of the scan response message and the detailed information on the wireless communication interface of the second device 300 may be included in the PDU of the scan response message.

The PDU of the scan response message includes an AdvA field and a ScanRspData field.

The AdvA field indicates a type of the scan response PDU, and the AdvA field may have a SCAN_RSP type among the types shown in Table 1, or have a LONG_SCAN_RSP type that is an extension type of the SCAN_RSP type.

The ScanRspData field includes a Type field indicating a type of information of the wireless communication interface requested by the first device 200 and a Data field including detailed information on the information type.

The first device 200 and the second device 300 may perform a connection procedure of the wireless communication interface based on the transmitted detailed information (S1640).

FIG. 18 is a flowchart illustrating still yet another example of the method for providing the information of the wireless communication interface through the Bluetooth LE connection process, which is proposed by this specification.

Referring to FIG. 18, a Bluetooth BR/EDR connection procedure may be performed by exchanging information on Bluetooth BR/EDR through the BLE connection procedure described in FIG. 16.

Since steps S1810 to S1830 in FIG. 18 are the same as steps S1610 to S1630 of FIG. 16, a description thereof will be omitted.

The first device 200 which acquires the information on the Bluetooth BR/EDR from the second device 300 through the scan response message exchanges connection with the second device 300 and a service start commend in order to perform the Bluetooth BR/EDR connection procedure (S1840).

Thereafter, the first device 200 performs a paging procedure to connect the Bluetooth BR/EDR.

In the paging procedure, the first device 200 enters a BR/EDR paging state and the second device 300 enters a paging scan state.

The first device 200 transmits an ID packet to the second device 300 in the paging state (S1850).

When the second device 300 receives the ID packet transmitted by the first device, the first device 200 enters a BR/EDR master response state in the BR/EDR paging state and the second device 300 enters a BR/EDR slave state in the BR/EDR paging state.

Thereafter, the first device 200 transmits a second ID packet in a channel transmitting the ID packet (S1860).

The second device 300 receiving the second ID packet transmits a frequency hopping synchronization (FHS) packet to the first device 200 for frequency synchronization (S1870).

When the paging procedure is completed, the first device 200 and the second device 300 are switched to the BR/EDR connection state.

Thereafter, the second device 300 is switched to a hopping pattern of the first device 200, and in order to verify this, the first device 200 transmits a Poll packet to the second device 300 (S1880). The second device receiving the Poll packet transmits a data packet to the first device 200 in response to the Poll packet (S1890) and terminates the Bluetooth BR/EDR connection procedure.

In this way, the first device 200 and the second device 300 may perform the Bluetooth BR/EDR connection procedure and may search for a partner device through the BLE without performing a separate query process.

FIG. 19 is a flowchart illustrating one example of a method for providing information of a wireless communication interface through Bluetooth LE, which is proposed by this specification.

Referring to FIG. 19, a connection may be formed by exchanging information on the wireless communication interface other than the BLE through BLE connection between devices.

Specifically, the first device 200 and the second device 300 perform the BLE connection (alternatively, pairing) procedure described above to form a BLE connection (S1910).

The first device 200 forming the BLE connection operates as a master device and the second device 300 operates as a slave device.

The roles of the master device and the slave device may be changed according to a situation.

When the first device 200 and the second device 300 which form the BLE connection intend to connect a different wireless communication interface from the BLE, the first device 200 and the second device 300 may exchange information on the wireless communication interface through the BLE (S1920).

At this time, the first device 200 and the second device 300 may exchange the information of the wireless communication interface using the method described in FIGS. 9 to 15 such as a GATT profile.

Thereafter, the first device 200 and the second device 300 exchange a start command (S1930), and perform the connection procedure of the wireless communication interface based on the exchanged information.

FIG. 20 is a flowchart illustrating another example of the method for providing the information of the wireless communication interface through the Bluetooth LE, which is proposed by this specification.

Referring to FIG. 20, a Bluetooth BR/EDR connection procedure may be performed by exchanging information on Bluetooth BR/EDR through the BLE described in FIG. 19.

In detail, before the BLE connection is formed, the first device 200 exists in an initiating state and the second device 300 exists in an advertising state.

In the advertising state, the second device 300 transmits an advertising message to the neighboring devices so as to notify the second device 300 (S2010).

The first device 200 receiving the advertising message transmits a connection request message to the second device 300 to form the BLE connection with the second device 300 (S2020).

Thereafter, the first device 200 and the second device 300 enter a BLE connection state and may transmit and receive data.

When the first device 200 and the second device 300 which form the BLE connection intend to connect a different wireless communication interface from the BLE, the first device 200 and the second device 300 may exchange information on the wireless communication interface through the BLE (S2030).

At this time, the first device 200 and the second device 300 may exchange the information of the wireless communication interface using the method described in FIGS. 9 to 15. The first device 200 and the second device 300 which exchange the information on the wireless communication interface exchange a start command for the Bluetooth BR/EDR connection (S2040).

Thereafter, the first device 200 performs a paging procedure to connect the Bluetooth BR/EDR.

In the paging procedure, the first device 200 enters a BR/EDR paging state and the second device 300 enters a paging scan state.

Hereinafter, since steps S2050 to S2090 are the same as steps S1850 to S1890 of FIG. 18, a description thereof will be omitted.

FIG. 21 is a flowchart illustrating one example of a method for providing information of a wireless communication interface through a Bluetooth LE connection procedure and Bluetooth LE, which is proposed by this specification.

Referring to FIG. 21, after two devices exchange information on a simple wireless communication interface through an advertising procedure for BLE pairing, when detailed information on the wireless communication interface is required, after BLE pairing, the detailed information on the wireless communication interface may be exchanged.

Specifically, the first device 200 and the second device 300 are not BLE-connected to each other without performing the BLE pairing procedure, and the first device 200 exists in a scanning state and the second device 300 exists in an advertising state.

The second device 300 can exchange information on a wireless communication interface of the second device 300 to the first device 200 through the PDU of the advertising message as described in FIG. 16 (S2110).

The first device 200 and the second device 300 which exchange the information on the wireless communication interface perform the BLE pairing procedure to form a BLE link (S2120).

Thereafter, if the detailed information on the wireless communication interface is required, the first device 200 and the second device 300 may exchange the detailed information on the wireless communication interface through the BLE link by the method described in FIGS. 9 to 15 (S2130).

After the first device 200 and the second device 300 exchanging the detailed information on the wireless communication interface exchange the start command (S2140), the connection procedure of the wireless communication interface may be performed based on the information on the wireless communication interface.

The method described in FIG. 21 is a combination form of the methods in FIGS. 16 and 18 and has an effect of providing efficiency and immediacy of the BLE connection procedure and information exchange in a higher layer through the BLE link.

FIG. 22 is a flowchart illustrating another example of the method for providing the information of the wireless communication interface through the Bluetooth LE connection procedure and the Bluetooth LE, which is proposed by this specification.

Referring to FIG. 22, a Bluetooth BR/EDR connection procedure may be performed by exchanging information on Bluetooth BR/EDR through the BLE described in FIG. 21.

In detail, before the BLE connection is formed, the first device 200 exists in an initiating state and the second device 300 exists in an advertising state.

When the second device 300 intends to form the wireless communication interface connection other than the BLE in the advertising state, the second device 300 may exchange information on the wireless communication interface to the first device (S2200).

The information of the wireless communication interface may include a Bit_Mask type described in FIG. 7 or the interface summary information of the data stream described in FIGS. 9 and 10.

The first device 200 exchanging the information of the wireless communication interface enters an initiating state.

The second device 300 transmits an advertisement message to the first device 200 to perform the BLE connection procedure (S2210).

The first device 200 that recognizes the second device 300 through the advertising message transmits a connection request message for BLE connection to the second device 300 (S2200), and the first device 200 and the second device enter a connection state.

Thereafter, the first device 200 and the second device 300 exchange detailed information on the wireless communication interface using the methods described in FIGS. 9 to 15 through the BLE (S2230) and exchange a start command to perform the connection procedure (S2240).

Thereafter, the first device 200 performs a paging procedure to connect the Bluetooth BR/EDR.

In the paging procedure, the first device 200 enters a BR/EDR paging state and the second device 300 enters a paging scan state.

Hereinafter, since steps S2250 to S2290 are the same as steps S1850 to S1890 of FIG. 18, a description thereof will be omitted.

FIG. 23 is a flowchart illustrating yet another example of the method for providing the information of the wireless communication interface through the Bluetooth LE connection process, which is proposed by this specification.

Referring to FIG. 23, when the wireless communication interface other than the BLE is activated, the device may acquire the information on the wireless communication interface supportable by a partner device through the BLE and perform the connection procedure of the wireless communication interface.

Specifically, the first device 200 and the second device 300 are in a state in which the BLE connection is not established.

In order to recognize other neighboring devices capable of performing BLE communication, the first device 200 enters a scanning state and the second device 300 enters an advertising state.

In this case, the wireless communication interface between the first device 200 and the second device 300 exists in an activated state.

The first device 200 in the scanning state and the second device 300 in the advertising state may exchange information on the supportable wireless communication interface in a state in which the BLE connection is not established (S2300).

The second device 300 receiving the information of the wireless communication supportable by the first device 200 transmits an advertising message to the first device (S2310).

The advertisement message may be a message for transmitting a scan request message of the first device 200 and may be a message for handover.

If the advertising PDU is a PDU for transmitting the scan request PDU, the advertising PDU may have the same format as the data format of the advertising PDU described in FIGS. 16 and 17.

However, if the advertising PDU is a PDU for handover, the type of the advertising PDU has a separate type and has one of reserved values shown in Table 1.

In addition, when the advertising PDU is a PDU for handover, the second device 300 may acquire information that a handover procedure will be performed through information included in the advertising PDU.

The first device 200 receiving the advertising PDU transmits a scan request PDU to the second device 300 in order to request detailed information on the wireless communication interface supported by the second device (S2320).

The PDU of the scan request message has the type described in FIGS. 16 and 17.

The second device 300 receiving the scan request message transmits the detailed information of the requested wireless communication interface to the first device 200 through the scan response PDU (S2330).

Thereafter, the first device 200 and the second device 300 perform the connection procedure based on the information on the wireless communication interface, and the first device 200 and the second device 300 are connected to each other through the wireless communication interface (S2340).

FIGS. 24 and 25 are diagrams illustrating another example of the data format, which is proposed by this specification.

Referring to FIGS. 24 and 25, other two embodiments of the PDU of the advertising message used in this specification may be described. The AdvA field included in each embodiment may be the same as the AdvA field shown in FIGS. 16 and 17 described above or the AdvA field described in FIG. 23.

The AdvData field of the PDU of the advertising message in FIG. 24 may include a Service Data field, an SDO ID/SIG ID field, and a Length field.

The SDO ID/SIG ID field indicates a type of the wireless communication interface, and the Length field indicates the overall length of the PDU field or the Common Header field and the SDO Specific Contents field.

Table 5 below illustrates an example of a type of wireless communication interface that may be included in the SDO ID/SIG ID.

TABLE 5

| SDO/SIG ID | Description |
| --- | --- |
| 1 | Wi-Fi |
| 2 | Wi-Fi Direct |
| 3 | WFDS Print |
| 4 | WFDS Display |
| 5 | Wi-Fi Display |
| 6 | NFC |
| 7 | Classic Bluetooth |
| 8 | WiGig |
| 9 | Zigbee |
| 10 | Future Interface |

In addition, the AdvData field in FIGS. 24(a) and FIG. 25 may further include a PDU field.

The PDU field is a field including simple information of the wireless communication interface and includes other information depending on the type of the wireless communication interface.

If the wireless communication interface is a Bluetooth BR/EDR, the PDU field includes a BR/EDR header field and an Entire Contents field.

The BR/EDR header field indicates which message the detailed information on the wireless communication interface is included.

Table 6 below illustrates an example of the BR/EDR header.

TABLE 6

| $7^{th}$ bit | $6^{th}$ bit | $5^{th}$ bit | $4^{th}$ bit | $3^{rd}$ bit | $2^{nd}$ bit | $1^{st}$ bit |
| --- | --- | --- | --- | --- | --- | --- |
| MD1 | MD0 | | | TBD | | |

Table 7 below illustrates an example of a location of the detailed information on the wireless communication interface according to the sixth or seventh bit.

TABLE 7

| Sixth bit value | Seventh bit value | Location of detailed information |
| --- | --- | --- |
| 0 | 0 | No More Data |
| 0 | 1 | More Data in Scan Response |
| 1 | 0 | More Data in GATT information |
| 1 | 1 | More Data in Scan response and GATT information |

The advertising PDU in FIGS. 24(b) and 25(b) further includes a Common Header field and an SDO Specific Content field.

The Common Header field has the same format as the BR/EDR Header field, and the SDO Specific Content field may include information required for obtaining specific information on the wireless communication interface.

For example, when the wireless communication interface is the Bluetooth BR/EDR, the SDO Specific Content may include frequency hopping synchronization (FHS) information.

The PDU of the advertising message described above may be used in the embodiment in which the PDU of the advertising message of the present specification is used.

FIG. 26 is a flowchart illustrating yet another example of the method for providing the information of the wireless communication interface through the Bluetooth LE, which is proposed by this specification.

Referring to FIG. 26, while the brief wireless communication interface is deactivated, brief information of the wireless communication interface is exchanged through the Bluetooth LE connection step and the detailed information on the wireless communication interface may be exchanged through the data transmission method of the higher layer.

Specifically, the first device 200 and the second device 300 are in a state in which the BLE connection is not formed.

In order to recognize other neighboring devices capable of performing BLE communication, the first device 200 enters a scanning state and the second device 300 enters an advertising state.

In this case, the wireless communication interface between the first device 200 and the second device 300 exists in a deactivated state.

The first device 200 in the scanning state and the second device 300 in the advertising state may exchange information on the supportable wireless communication interface in a state in which the BLE connection is not established (S2610).

Thereafter, the first device 200 and the second device 300 enter a BLE connection state through the BLE connection procedure.

In the BLE connection state, the first device 200 transmits a GATT Read request to the second device 300 to acquire the detailed information on the wireless communication interface stored in the GATT data base (S2620).

The second device 300 may transmit the information requested from the first device 200 to the first device 200 through the GATT Read response (S2630).

The first device 200 receiving the GATT Read response including the detailed information on the wireless communication interface transmits a GATT Write request to the second device 300 to exchange Anchor Point information or Delay Value information (S2640), and receives a GATT Write response in response to the GATT Write request (S2650).

In this case, the Anchor Point information and the Delay Value information may be exchanged by three methods.

First, the first device 200 transmits its Anchor Point information and/or Delay Value information to the second device 300 to be included in the GATT Write request, and the second device 300 transmits its Anchor Point information and/or Delay Value information to the first device 200 to be included in the GATT Write response to share the Anchor Point information and/or Delay Value information.

Second, the first device 200 transmits its Anchor Point information and/or Delay Value information to the second device 300 to be included in the GATT Write request, and the second device 300 may set the Anchor Point and/or Delay Value values according to the transmitted information.

Third, the second device 300 transmits its Anchor Point information and/or Delay Value information to the first device 200 to be included in the GATT Write response, and the first device 200 may set the Anchor Point and/or Delay Value values according to the transmitted information.

The Anchor Point is information regarding when the connection procedure of the wireless communication interface starts, and the Delay Value is information regarding how soon the connection procedure of the wireless communication interface starts after the transmission or reception of the GATT Write response.

As one of the three methods, the first device 200 and the second device 300 sharing the Anchor Point or Delay Value are activated to connect the deactivated wireless communication interfaces.

Thereafter, the first device 200 and the second device 300 perform the connection procedure of the wireless communication interface after the time set as the Anchor Point or a delay time from the reception/transmission of the GATT Write response elapses (S2660), the connection state of the wireless communication interface is established.

FIG. 27 is a diagram illustrating one example of a user interface (UI), which is proposed by this specification.

As shown in FIG. 27A, devices such as a TV 300-1, a headset 300-2, a band 300-3, a projector 300-4, and the like include various wireless interfaces.

For example, the TV 300-1 may include a wireless communication interface for Bluetooth BR/EDR, Bluetooth LE, Wi-Fi, or Wi-Fi Direct and the Headset 300-2 may include a wireless communication interface for Bluetooth BR/EDR or Bluetooth LE.

Such wireless communication interfaces connect the devices through the various embodiments described above so that wireless communication between the first device 200 and the second device 300 is possible.

In this case, when the neighboring devices are searched using the BLE included in the first device 200, the neighboring devices use the BLE to inform to the first device 200 which wireless communication interface is included.

FIG. 27B illustrates that neighboring devices searched by the first device 200 and types of wireless communication interfaces included in the searched devices are displayed on the first device 200.

When the user selects the wireless communication device and the interface displayed on the first device 200, the connection procedure of the selected wireless communication interface is performed, and the first device and the selected device are connected to each other through the selected wireless communication interface.

Table 8 below is a table showing an example of a command used in the embodiment of the present invention.

TABLE 8

| Name | Description |
| --- | --- |
| Power On | Command to turn on interface when an interface to be used by the user is in an off state |
| Power Off | Command to turn off interface when a service to be used by the user is completed |
| Information Update | Command to update information on interface stored in BLE when the information of the interface is changed. |
| Time out | Stop corresponding operation when handover procedure is not completed within predetermined time |
| Direct connection | Perfume direct connection to another interface without delay |
| Handover Start | Command to perform handover |
| Handover End | Command to stop service of handed-over interface |
| Reason Request | Command to request reason of failure factor in handover failure |
| Authority setting | Command to set control authrotiy of device to be connected |
| Force Disconnection | Command to disconnect corresponding connection when connected device is connected to other devices |
| Security setting | Command to set security strength for each interface |

FIG. 28 is a diagram illustrating one example of a method for sharing a channel map between wireless communication interfaces, which is proposed by this specification.

When two devices perform handover between the wireless communication interfaces, it is inefficient to form a new channel map after handover separately from a channel map which has been used in the past.

Accordingly, a channel map may be efficiently generated by determining whether to form a channel map after hand over or form a new channel map based on the channel map before handover by setting a separate channel map parameter.

The channel map parameter indicates whether to configure a channel map after handover or configure a new channel map based on the channel map before handover.

For example, as shown in FIG. 28, in the case of (a) handover from the BLE to the Bluetooth BR/EDR, if the channel map parameter is a true value, the Bluetooth BR/EDR channel map may be configured based on the channel map which has been used in the existing BLE.

However, if the channel map parameter is a false value (b), a new channel map may be configured and used without using the channel map which has been used in the existing BLE.

According to this method, since the channel map before handover is used, time and power consumption for generating the channel map are reduced, and the channel map may be efficiently generated.

FIG. 29 is a flowchart illustrating one example of a method for sharing a channel map between wireless communication interfaces, which is proposed by this specification.

Referring to FIG. 29, when two devices perform handover of the wireless communication interface, whether to form a channel map after handover based on the existing channel map may be determined.

In this case, if the first device 200 forms a channel map based on the existing channel map and the second device 300 forms a new channel map, communication between the first device 200 and the second device 300 may not be performed smoothly.

Therefore, in order to solve such a problem, the first device 200 and the second device 300 exchange the channel map parameter information described in FIG. 28 to determine formation of a new channel map.

Specifically, the first device 200 and the second device 300 form the BLE connection (S2910). The first device 200 and the second device 300 forming the BLE connection may form a channel map for BLE communication.

Thereafter, the first device 200 and the second device 300 perform a handover procedure to the Bluetooth BR/EDR through one of the embodiments described above (S2920) to form a Bluetooth BR/EDR connection.

In this case, the first device 200 and the second device 300 exchange the channel map parameter value through the handover procedure.

When the value of the channel map parameter is set to True, the first device 200 and the second device 300 configure a channel map based on the channel map before handover, and when the value of the channel map parameter is set to False, the first device 200 and the second device 300 configure a new channel map to perform the Bluetooth BR/EDR communication.

Such a method has the effect of solving the problem of the channel map compatibility caused by varying a method of forming the channel map for each device.

FIG. 30 illustrates one example of a method for announcing a serviceable range between wireless communication interfaces, which is proposed by this specification.

The first device 200 may search for neighboring devices through the BLE and perform a handover to other wireless communication interfaces other than the BLE with the searched second device 300.

In this case, as illustrated in FIG. 30A, when a service area of the wireless communication interface to be handed-over is larger than a BLE service area, there is no problem in providing a service after handover.

However, as illustrated in FIG. 30B, when the service area of the wireless communication interface to be handed-over is smaller than the BLE service area, there is a problem that the service after handover can not be provided.

Accordingly, in order to solve the problem, when searching for neighboring devices and wireless communication interfaces of the neighboring devices through the BLE, a service range of the wireless communication interface can be informed.

That is, when searching for neighboring devices and information on the wireless communication interfaces of the neighboring devices through the BLE, a parameter indicating information regarding a serviceable range of the wireless communication interface may be transmitted.

The service region of the wireless communication interface is determined through the parameter to perform the handover only in the serviceable case, thereby solving the problem that the service may not be provided after the handover.

If the value of the parameter may not be accurately calculated, the serviceable area can be estimated through information such as transmission power of the wireless communication interface other than the BLE.

FIG. 31 is a flowchart illustrating one example of exchanging frequency hopping synchronization (FHS) information of a Bluetooth BR/EDR through Bluetooth LE, which is proposed by this specification.

Referring to FIG. 31, the first device 200 and the second device 300 form a BLE connection through a BLE connection procedure (S3110).

The first device 200 and the second device 300 forming the BLE connection exchange frequency hopping synchronization (FHS) information (S3120) and store the exchanged FHS information in a GATT data base.

Thereafter, the first device 200 and the second device 300 perform a handover procedure to the Bluetooth BR/EDR from the BLE based on the FHS information stored in the GATT data base (S3130) to be in a Bluetooth BR/EDR connection state (S3140).

By such a method, the first device 200 and the second device 300 may exchange information required for connection without exchanging the FHS information in a situation where a Bluetooth BR/EDR connection is not established to immediately perform the handover.

FIG. 32 is a diagram illustrating power consumption between Bluetooth LE and Wi-Fi.

Referring to FIG. 32, in an environment in which two interfaces of the Bluetooth LE and the Wi-Fi are together used, energy consumption by activating each device may be verified.

In detail, FIG. 32(a) illustrates a case in which a Wi-Fi display service is performed in a situation in which the Bluetooth LE and the Wi-Fi Direct are activated in the device. In this case, since the Bluetooth LE and the W-Fi Direct are already activated, power consumed before the Wi-Fi Display service is performed later is large.

However, referring to FIG. 32(b), in normal times, only the Bluetooth LE is activated and the residual interface (for example, Wi-Fi) is deactivated and thereafter, only when needed, the service is performed by activating the individual interfaces.

For example, the Bluetooth LE having high energy efficiency between the Bluetooth LE and the Wi-Fi is designated as an interface which is always activated (Always-On Interface) and in normal times, only the Bluetooth LE is activated and the Wi-Fi interface maintains an inactivate or sleep/power off state.

Thereafter, when a Wi-Fi display (Miracast) function is required through the Wi-Fi Direct, the Wi-Fi Direct and the Wi-Fi Display of a counter device are supported is discovered through the Bluetooth LE and thereafter, the Wi-Fi interfaces of an own device and a target device are activated (alternatively, powered on) and then, the Wi-Fi Display function is performed through a Wi-Fi Direct association procedure.

In the case of such a method, since only the Bluetooth LE is activated in normal times, it may be verified that the power consumption is reduced as compared with FIG. 32(a).

The present invention proposes a method that increases energy efficiency by activating only the interface having the high energy efficiency in normal times and then, activating another external interface through the interface having the high energy efficiency when needed.

FIG. 33 is a diagram illustrating a connection process of Wi-Fi Direct.

Referring to FIG. 33, a case of using the Wi-Fi Display (Miracast) in the Wi-Fi Direct is described as an example. In the case of the Wi-Fi Display service of the Wi-Fi Direct, the second device 300 is discovered through a Wi-Fi Direct discovery procedure (S3410).

The first device 200 that discovers the second device 300 determines a group owner through a group owner negotiation procedure with the second device (S3420) and performs AP-access point station (STA) negotiation and connection procedures (S3430).

Thereafter, an IP Address acquisition procedure (S3440) and a Wi-Fi Display negotiation and connection procedure (S3450) are performed and the Wi-Fi Display service is provided through a video streaming procedure (S3460).

In the discovery procedure of the Wi-Fi Direct, three social channels are operated in the 2.4 GHz band and all devices determine one of tree social channels and stands by for receiving a probe request from the target device in the corresponding social channel.

However, since all devices may not know in which social channel the target device performs listening, stand-by in a listen channel and hopping to each social channel are simultaneously performed. Therefore, a lot of time and power are consumed during such a process.

According to the present invention, in order to solve the problem, the Wi-Fi Direct discovery procedure is performed through the Bluetooth LE or the Bluetooth BR/EDR. That is, proposed is a method that each device exchanges information such as the listen channel thereof, or the like through the Bluetooth LE or the BR/EDR and thereafter, a step of finding the listen channel of the target device in an actual Wi-Fi Direct connection procedure is simplified to reduce a Wi-Fi Direct connection time and power consumption.

The present invention is not contents limited to the Wi-Fi Display.

FIG. 34 is a diagram schematically illustrating an example of a method for connecting the Wi-Fi Direct by using the Bluetooth LE, which is proposed by the present specification.

Referring to FIG. 34, the method for connecting the Wi-Fi Direct through the Bluetooth LE may be described in brief In detail, in the case of the first device 200 and the second device 300, only the Bluetooth LE is activated and other interfaces are inactivated in normal times.

Thereafter, when the Wi-Fi Direct needs to be connected, the first device 200 and the second device 300 perform discovery and device capability exchange procedures in order to exchange information for discovering the counter device and connecting the Wi-Fi Direct through the Bluetooth LE (S3310).

The first device 200 and the second device 300 may acquire information on the counter device for connecting the Wi-Fi Direct through the procedures.

For example, the first device 200 may acquire information on the listen channel of the second device and thus transmit the probe request in the listen channel.

Thereafter, a role negotiation process for determining the group owner through the Bluetooth LE is performed (S3320).

When the group owner is determined, each of the first device 200 and the second device 300 may activate (alternatively, awake) the Wi-Fi interface and transmit/receive data through the Wi-Fi Direct (S3330).

FIG. 35 is a diagram schematically illustrating an example of a method using the Bluetooth LE during the Wi-Fi Direct connection process, which is proposed by this specification.

The case of providing the Wi-Fi Display service using the Wi-Fi Direct may be divided into a peripheral device discovery process for supporting the Wi-Fi Direct service and a process of connecting the discovered device and the Wi-Fi Direct/Display.

When a time required for the peripheral device discovery process and the Wi-Fi Direct/Display connection process is measured, approximately 5 to 9 seconds are required for the Wi-Fi Direct device discovery procedure and approximately 7 to 9 seconds are required for the Wi-Fi Direct/Display connection process.

In this case, when the Wi-Fi Direct device discovery process is performed through the Bluetooth LE, the time required for the procedure may be reduced.

That is, as described in FIG. 34, information (for example, listen channel information) for connecting the second device 300 and the Wi-Fi Direct is exchanged through the Bluetooth LE to reduce a time required for finding the listen channel.

FIG. 36 is a flowchart illustrating an example of a method for connecting the Wi-Fi Direct by using a connection procedure of the Bluetooth LE, which is proposed by this specification.

Referring to FIG. 36, information for connecting the Wi-Fi Direct is acquired through a message transmitted/received during the connection procedure of the Bluetooth LE to reduce a time and power required for the connection procedure of the Wi-Fi Direct.

In detail, in the case of the first device 200 and the second device 300, only the Bluetooth LE is activated and other interfaces are inactivated in normal times.

Thereafter, the first device 200 and the second device 300 is in an advertising state for connecting the Bluetooth LE and perform the Wi-Fi Direct connection through an interface discovery procedure, a detailed information request procedure, and a handover procedure. Hereinafter, each procedure will be described.

Interface Discovery Procedure

In the interface discovery procedure as a procedure for exchanging information on a usable interface of each device, the second device 300 transmits an advertising message to the first device 200 in the advertising state (S3610). The advertising message is a message for announcing a type of an interface supported by the second device 300, an on/off state of the interface, whether the interface is usable, and the like through an advertising packet.

In the interface discovery procedure, the second device 300 provides such information in order to provide a handover operation which may be requested to thereto.

In this case, since considerations into the energy efficiency of the respective devices may be different from each other, an advertising interval may vary for each device.

FIG. 37 is a diagram illustrating an example of a data format for an advertising message, which is proposed by this specification. Referring to FIG. 37, a type of the advertising message PDU may include following types.

ADV_IND
ADV_NONCONN_IND
EXTENDED_ADV_IND
LONG_ADV_NONCONN_IND

An AdvData field of the advertising message PDU as a field including the described information may be constituted by a D_Type field and a D_Flag field.

In the D_Flag field, the interface information described in FIG. 7 and Tables 1 and 2 is included as the Bit_Mask format.

The D_Type field is a value for determining the type of the D_Flag and information shown in Table 8 given below are included in the D_Type field as the Bit_Mask format described in FIG. 7.

TABLE 9

| Value | Type |
|---|---|
| 0 | Un_used |
| 1 | Supported Tech |
| 2 | Status(On/Off) |
| 3 | Availability |
| 4 | Sharable |

Since the information transmitted through the advertising message needs to be periodically transmitted, when the information is transmitted as the Bit Mask format, consumed power may be reduced.

The second device which acquires interface-associated information from the second device 300 through the advertising message may acquire detailed information for a specific interface through the detailed information request procedure as necessary.

Detailed Information Request Procedure

The detailed information request procedure is performed for requesting the detailed information of the specific information based on information on interfaces, which is collected through the interface discovery procedure.

The detailed information request procedure may be required for hand-over to the specific interface and just performed in order to request only the detailed information.

In the Bluetooth LE connection procedure, in order to perform the detailed information request procedure, the first device 200 transmits a scan request to the second device 300 (S3620).

The second device that receives the scan request transmits the scan response including the information on the specific interface, which is requested by the second device to the first device 200 (S3630).

FIG. 38 is a diagram illustrating an example of a data format of a response message to a detailed information request of an interface, which is proposed by this specification.

The type of the scan response message may have a SCAN_RSP or LONG_SCAN_RSP.

Since there is a limit in the size of data, the SCAN_RSP type may be configured only by requisite data required for the Wi-Fi connection procedure as illustrated in FIG. 38(a). That is, the SCAN_RSP may include at least one of network type information, a MAC address of a peer device, the listen channel, a channel type, an SSID, and security type information.

Since the LONG_SCAN_RSP type is relatively smaller than the SCAN_RSP type in terms of the size of the number of data which may be included.

In the scan response of the LONG_SCAN_RSP type, a More Data for service field may include data depending on the type of the service of the Wi-Fi Direct.

The detailed information request procedure may be performed not according to the requisite procedure but as necessary. The first device 200 that acquires the detailed information on the interface through the detailed information request procedure may be Wi-Fi-connected with the second device 300 through the handover procedure.

Hereinafter, the handover procedure will be described.

Handover Procedure

The first device 200 and the second device 300 that perform the detailed information request procedure activates (alternatively, turns on) the Wi-Fi interface and performs the handover to the Wi-Fi Direct for the Wi-Fi connection (S3640).

FIGS. 39 to 41 are diagram specifically illustrating a handover procedure and the data format of FIG. 36, which is proposed by this specification.

In detail, since the first device 200 and the second device 300 do not enter the data channel of the Bluetooth LE while the Bluetooth LE is not connected, the first device 200 and the second device 300 need to perform all procedures only within the advertising channel.

Therefore, as illustrated in FIG. 39, the first device 200 transmits a request message for hand-over to the Wi-Fi Direct to the second device 300 through the advertising channel (S3910).

In this case, when the interface of the counter device is inactivated (alternatively, turned off), since a command for activating (alternatively, turning on) the interface may be required, the request message may include a command for activating the interface of the second device 300.

As illustrated in FIG. 41, the PDU of the request message may be constituted by a Peer ADDR field including address information of the counter device, that is, the second device and a Data field including information required for the handover.

The Data field may be constituted by the D_Flag field and the CMD field described in FIG. 37.

The CMD field includes the command required for the handover as shown in Table 10 given below.

TABLE 10

| Value | Type |
|---|---|
| 0 | Un-Used |
| 1 | Interface ON |
| 2 | Interface OFF |
| 3 | Handover Start |
| 4 | Handover Terminate |
| 5 | Timeout |

When the interface is activated (alternatively, turned on), the command may not be required.

The second device 300 that receives the request message may transmit a response message to the first device 200 as a response to the request message (S3920). In this case, the response message may include a result of the command included in the request message.

As illustrated in FIG. 41(b), the response message may be constituted by the Peer ADDR field including the address information of the counter device, that is, the first device 200 and the Data field including the data.

The data field may be constituted a Result field and a Reason field, and the Result field represents the result of the command included in the request message and the Reason field includes a reason for the result.

Table 11 given below shows one example of a value which may be included in the Result field and Table 12 given above shows one example of a value which may be included in the Reason field.

TABLE 11

| Value | Description |
|---|---|
| 1 | Success |
| 2 | Fail |

TABLE 12

| Value | Description |
|---|---|
| 1 | Interface Busy |
| 2 | Not Supported |
| 3 | Authority Fail |
| 4 | Security Fail |
| 5 | Timeout |
| 6 | Cannot Connect |
| 7 | Channel Busy |
| 8 | Command Error |
| 9 | No Reason |

The first device 200 and the second device 300 that exchange the request message and the response message perform a request command and connect the corresponding interface to provide the service.

For example, in FIG. 39, the first device 200 and the second device 300 activate (alternatively, turn on) the Wi-Fi interface and forms the Wi-Fi Direct connection to provide the service (S3930).

FIG. 40 illustrates a method that immediately forms the interface connection without a separate command.

For example, when the interface is turned on, a command for activating the interface may not be separately required. Therefore, the first device 200 and the second device 300 forms the connection immediately after the detailed information request procedure to provide the service (S4010).

As described above, the method described in FIGS. 36 to 41 is a scheme that performs in the advertising channel during the connection procedure of the Bluetooth LE.

In such a scheme, the first device 200 and the second device 300 need not enter the data channel through the Bluetooth connection and operate only in the advertising channel such as advertising and scanning. Accordingly, a separate Bluetooth LE connection may not be required.

FIG. 42 is a flowchart illustrating an example of a method for connecting the Wi-Fi Direct by using the Bluetooth LE, which is proposed by this specification.

Referring to FIG. 42, the interface discovery procedure and the detailed information request procedure described in FIGS. 36 to 41 may be performed in the advertising channel and the handover procedure may be performed after the Bluetooth LE connection.

Since steps S4210 to S4230 give below are the same as steps S3610 to S3630 of FIG. 36, a description thereof will be omitted.

In detail, the first device 200 that performs the detailed information request procedure transmits a connection request message to the second device for the connection of the Bluetooth LE (S4240). The second device 300 that receives the connection request message transmits a connection response message to the first device 200 as the response thereto (S4250) and the first device 200 and the second device 300 form the Bluetooth LE connection.

Thereafter, the first device 200 and the second device 300 that form the Bluetooth LE connection may exchange data in the data channel in the Generic Attribute Profile (GATT) form.

The first device 200 and the second device 300 may use a message such as a GATT read request/response or a GATT write request/response in order to exchange the data, that is, read or write the data in a GATT type in the data channel.

Accordingly, the first device 200 and the second device 300 exchange the GATT type message for handover to the Wi-Fi (S4260).

The first device 200 and the second device 300 that exchange the GATT type message execute a command associated with the handover, which is included in the GATT type message, such as activation of the Wi-Fi interface and form the Wi-Fi connection to provide the service (S4270).

Since the first and second devices 200 and 300 exchange the data at a profile level by entering the data channel by such a method, there is no limit in the size and the format of the data, but the first and second devices 200 and 300 may exchange the data only by forming the Bluetooth LE connection.

FIG. 43 is a flowchart illustrating another example of the method for connecting the Wi-Fi Direct by using the Bluetooth LE, which is proposed by this specification.

Referring to FIG. 43, the interface discovery procedure described in FIGS. 36 to 41 may be performed in the advertising channel and the detailed information request procedure and the handover procedure may be performed after the Bluetooth LE connection.

Hereinafter, since steps S4310, S4320, and S4330 are the same as steps S4210, S4230, and S4250 of FIG. 42, a description thereof will be omitted.

In detail, the first device 200 and the second device 300 form the Bluetooth LE connection and thereafter, move to the data channel to perform the detailed information request procedure and the handover procedure through the GATT type message described in FIGS. 42 (S4340).

That is, the first device 200 and the second device 300 may request and acquire detailed information of a specific interface through the message such as the GATT read request/response or GATT write request/response and transmit and receive the command associated with the handover and the response thereto.

The first device 200 and the second device 300 that exchange the GATT type message execute the command associated with the handover, which is included in the GATT type message, such as the activation of the Wi-Fi interface and form the Wi-Fi connection to provide the service (S4350).

In such a scheme, unlike the scheme described in FIG. 42, the detailed information request procedure is also performed at the GATT type profile level in addition to the handover procedure. Accordingly, in performing the detailed information request procedure, there is no limit in the size of the data unlike FIGS. 36 and 42, but the first device needs to form the Bluetooth LE connection with the second device.

FIG. 44 is a flowchart illustrating an example of the method for connecting the Wi-Fi Direct through connected Bluetooth LE, which is proposed by this specification.

Referring to FIG. 44, the interface discovery procedure, the detailed information request procedure, and the handover procedure described in FIGS. 36 to 41 may be performed after the Bluetooth LE connection.

In detail, in the case of the first device 200 and the second device 300, only the Bluetooth LE is activated and other interfaces are inactivated in normal times.

Thereafter, the first device 200 and the second device 300 is in an advertising state for connecting the Bluetooth LE and the second device transmits the advertising message in order to perform the advertising procedure. The first device 200 that recognizes the second device 300 through the advertising message transmits the connection request message in order to form the Bluetooth LE connection with the second device 300 to the second device 300 (S4240).

The second device 300 that receives the connection request message transmits a connection response message to the first device 200 as the response thereto (S4250) and the first device 200 and the second device 300 form the Bluetooth LE connection.

The first device 200 and the second device 300 form the Bluetooth LE connection and thereafter, move to the data channel to perform the interface discovery procedure, the detailed information request procedure, and the handover procedure through the GATT type message described in FIGS. 42 (S4440).

That is, the first device 200 and the second device 300 may acquire detailed information associated with an interface and a service which may be supported through the message such as the GATT read request/response or GATT write request/response.

Further, the first device 200 and the second device 300 may request and acquire the detailed information of the specific interface through the message such as the GATT read request/response or GATT write request/response and transmit and receive the command associated with the handover and the response thereto.

Table 13 give below shows one example of information and a command which may be transmitted at the GATT type profile level of FIGS. 42 to 44.

TABLE 13

| Characteristic Name | Mandatory Properties |
| --- | --- |
| EI (External Interface )Type | Read |
| EI Name | Read |
| EI Capability | Read |
| Wi-Fi(WiGig) Channel Class | Read |
| Wi-Fi(WiGig) Operation(Listen) Channel | Read, Write |
| EI Power Save Mode | Read, Write |
| EI Security Type | Read, Write |
| EI Security Mode | Read, Write |
| EI Security Information | Read, Write |
| Authority | Read, Write |
| EI Status | Read |
| EI Activate | Write |
| EI Activate All | Write |
| EI Terminate | Write |
| EI Terminate All | Write |
| EI Activate Delay | Read, Write |
| EI Local Address | Read |
| EI Peer Address | Read |
| EI BSSID | Read |
| Duty Cycle (Sleep/Wakeup) | Read, Write |

TABLE 13-continued

| Characteristic Name | Mandatory Properties |
| --- | --- |
| Instant Operation | Read, Write |
| EI Handover Start | Write |
| EI Handover Terminate | Write |
| EI Information | Read, Write |
| EI Information Update | Read, Write |
| Reason for Handover Fail | Read |
| Force Disconnect | Write |
| WPS Information | Read, Write |
| IP Network Information | Read, Write |
| RTSP Port | Read, Write |
| RTSP Information | Read, Write |
| RTP Port | Read, Write |
| RTP Information | Read, Write |
| Docking Information | Read, Write |
| Remained Energy | Read |
| Supplied Power Type | Read |
| WFDS SEND Information | Read, Write |
| WFDS DISPLAY Information | Read, Write |
| WFDS PRINT Information | Read, Write |
| Docking Peripheral Num | Read, Write |
| Docking Peripheral Group | Read, Write |
| Docking Capability | Read |
| Service Version | Read |
| Sharable | Read |
| Concurrent Operation Status | Read |
| EI Channel Status | Read |
| EI Tx Power | Read, Write |
| Wi-Fi(WiGig) SSID | Read, Write |
| WPS Configuration Method | Read, Write |
| WPS Role | Read, Write |
| WPS UI Type | Read |
| WFDS DISPLAY Information | Read, Write |

The first device 200 and the second device 300 that exchange the GATT type message execute the command associated with the handover, which is included in the GATT type message, such as the activation of the Wi-Fi interface and form the Wi-Fi connection to provide the service (S4450).

In such an invention, since the interface discovery procedure needs to be first performed at the GATT type profile level, all external interfaces may be determined only by performing the Bluetooth LE connection.

However, since the second device 300 and the first device 200 need not periodically transmit information on interfaces which may be provided thereby, power consumption is small in an idle state and since the second device 300 and the first device 200 exchange information through the data channel, there is no limit in the size of the data.

When the Wi-Fi or other interfaces are connected through the method described in FIGS. 36 to 44, only the interface (for example, the Bluetooth LE) having the high energy efficiency is activated (alternatively, turned on) and other interfaces are inactivated (alternatively, turned off) in normal times to reduce energy consumption.

Further, since information required for the connection procedure with other interfaces may be acquired through the Bluetooth LE, an effect to shorten the connection procedure with the other interfaces may also be achieved.

FIG. 45 is a flowchart illustrating another example of the method for connecting the Wi-Fi Direct by using the Bluetooth LE, which is proposed by this specification.

Referring to FIG. 45, the Wi-Fi Direct connection may be performed through the interface discovery procedure and the detailed information exchange procedure described in FIGS. 36 to 44 and the Wi-Fi Display service may be provided through the connected Wi-Fi Direct.

In detail, in the case of the first device 200 and the second device 300, the Bluetooth LE is activated (alternatively, turned on) and the Wi-Fi is inactivated (alternatively, turned off).

When the first device 200 intends to provide the Wi-Fi Display service through the Wi-Fi Direct connection with the second device 300 in such a state, the interface discovery procedure (S4500) and the detailed information exchange procedure (S4510) described in FIGS. 36 to 44 may be performed.

The first device 200 and the second device 300 that perform the interface discovery procedure (S4500) and the detailed information exchange procedure (S4510) perform the handover procedure described in FIGS. 36 to 44 to activate (alternatively, turn on) the Wi-Fi (S4520).

Thereafter, the first device 200 and the second device 300 discover whether the Wi-Fi Display is supported through a FIND/SEARCH procedure (S4530) and determines the group owner through a 3-way GO negotiation process (S4540).

Thereafter, a Probing/Authentication/Association procedure (S4550), an EAP/Key Exchange procedure (S4560), a DHCP Configuration procedure (S4570), and an RTSP: Capability Negotiation<M~M8> procedure (S4580) are performed, and as a result, the first device 200 and the second device 300 may provide the Wi-Fi Display service through an A/V stream (S4590).

The aforementioned present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention.

The invention claimed is:

1. A method for forming a connection using other communication interfaces through Bluetooth low energy (LE) in a wireless communication system, the method performed by a first device and comprising:
   receiving, from a second device, an advertising message including information associated with the other communication interfaces;
   transmitting, to the second device, a request message for requesting detailed information of the other communication interfaces based on the information;
   receiving, from the second device, a response message including the detailed information as a response to the request message;
   forming a Bluetooth low energy (LE) connection with the second device;
   activating the other communication interfaces by using Bluetooth low energy (LE); and
   forming the connection with the second device,
   wherein the advertising message is transmitted through a specific channel for a Bluetooth low energy (LE) connection,
   wherein the information includes ID information for distinguishing the other communication interfaces, location information of the detailed information, status information on a status of the second device and capability information of the other communication interface, and
   wherein the location information on a location of a plurality of specific information for connecting the other communication interfaces is used to obtain the plurality of the specific information for connecting the other communication interfaces after forming the Bluetooth low energy (LE) connection between the first device and the second device.

2. The method of claim 1, wherein at least one of a scan response message or a GATT data base is included in the location information.

3. The method of claim 1, wherein the detailed information includes at least one of channel information for the connection, MAC address information of the second device, network type information, or channel type information, and
wherein the method further comprises:
obtaining the MAC address information of the second device by using the location information.

4. The method of claim 1, wherein the request message and the response message are transmitted or received through the specific channel.

5. The method of claim 1, wherein forming the Bluetooth low energy (LE) connection further comprises:
transmitting a Bluetooth low energy (LE) connection request message to the second device;
receiving a Bluetooth low energy (LE) connection response message from the second device as a response to the Bluetooth low energy (LE) connection request message; and
connecting with the second device through the Bluetooth low energy (LE), and
wherein the request message and the response message are transmitted or received through a data channel for transmitting or receiving data of Bluetooth low energy (LE).

6. The method of claim 1, further comprising:
transmitting, to the second device, a connection request message for the connection; and
receiving, from the second device, a response message as a response to the connection request message.

7. The method of claim 6, wherein the connection request message includes a command for the connection, and
the response message includes result information for the command and reason information for a failure when the result information shows the failure.

8. The method of claim 1, wherein the information further includes service information supported by the other communication interfaces, and the ID information, the location information, the capability information, and the service information are included in a bit format.

9. A first device in a method for forming a connection using other communication interfaces through Bluetooth low energy (LE) in a wireless communication system, the first device comprising:
a transceiver configured to transceive a signal by a wired and/or wireless scheme; and
a controller functionally connected with the transceiver, wherein the controller performs a control to
receive, from a second device, an advertising message including information associated with the other communication interfaces;
transmit, to the second device, a request message for requesting detailed information of the other communication interfaces based on the information;
receive, from the second device, a response message including the detailed information as a response to the request message;
form a Bluetooth low energy (LE) connection with the second device;
activate the other communication interfaces by using Bluetooth low energy (LE); and
form the connection with the second device,
wherein the advertising message is transmitted through a specific channel for a Bluetooth low energy (LE) connection,
wherein the information includes ID information for distinguishing the other communication interfaces, location information of the detailed information, status information on a status of the second device and capability information of the other communication interfaces, and
wherein the location information on a location of a plurality of specific information for connecting the other communication interfaces is used to obtain the plurality of the specific information for connecting the other communication interfaces after forming the Bluetooth low energy (LE) connection between the first device and the second device.

10. The first device of claim 9, wherein at least one of a scan response message or a GATT data base is included in the location information.

11. The first device of claim 9, wherein the detailed information includes at least one of channel information for the connection, MAC address information of the second device, network type information, or channel type information, and
wherein the controller performs a control to
obtain the MAC address information of the second device by using the location information.

12. The first device of claim 9, wherein the request message and the response message are transmitted or received through the specific channel.

13. The first device of claim 9, wherein the controller performs a control to:
transmit a Bluetooth low energy (LE) connection request message to the second device,
receive a Bluetooth low energy (LE) connection response message from the second device as a response to the Bluetooth low energy (LE) connection request message, and
connect with the second device through the Bluetooth low energy (LE), and
the request message and the response message are transmitted or received through a data channel for transmitting or receiving data of Bluetooth low energy (LE).

14. The first device of claim 9, wherein the controller transmits, to the second device, a connection request message for the connection, and receives, from the second device, a response message as a response to the connection request message.

15. The first device of claim 14, wherein the connection request message includes a command for the connection, and
the response message includes result information for the command and reason information for a failure when the result information shows the failure.

16. The first device of claim 9, wherein the information further includes service information supported by the other communication interfaces, and the ID information, the location information, the capability information, and the service information are included in a bit format.

* * * * *